(12) United States Patent
Sethumadhavan et al.

(10) Patent No.: US 12,360,845 B2
(45) Date of Patent: Jul. 15, 2025

(54) SYSTEMS AND METHODS FOR MULTI-USE ERROR CORRECTING CODES

(71) Applicant: The Trustees of Columbia University in the City of New York, New York, NY (US)

(72) Inventors: Lakshminarasimhan Sethumadhavan, New York, NY (US); Evgeny Manzhosov, New York, NY (US)

(73) Assignee: The Trustees of Columbia University in the City of New York, New York, NY (US)

( * ) Notice: Subject to any disclaimer, the term of this patent is extended or adjusted under 35 U.S.C. 154(b) by 186 days.

(21) Appl. No.: 17/847,377

(22) Filed: Jun. 23, 2022

(65) Prior Publication Data
US 2022/0413959 A1    Dec. 29, 2022

Related U.S. Application Data

(60) Provisional application No. 63/215,154, filed on Jun. 25, 2021.

(51) Int. Cl.
*G06F 11/10*    (2006.01)
*G06F 3/06*    (2006.01)

(52) U.S. Cl.
CPC ........ *G06F 11/1044* (2013.01); *G06F 3/0619* (2013.01); *G06F 3/0655* (2013.01); *G06F 3/0679* (2013.01)

(58) Field of Classification Search
CPC .... H03M 13/15; H03M 13/19; H03M 13/159; G06F 11/1044; G06F 11/1048; G06F 11/1076; G06F 3/0619; G06F 3/0655; G06F 3/0679; G06F 11/1068
See application file for complete search history.

(56) References Cited

U.S. PATENT DOCUMENTS

| 2014/0122964 A1 | 5/2014 | Chen |
| 2014/0215289 A1 | 7/2014 | Trezise et al. |

(Continued)

OTHER PUBLICATIONS

Alam et al., "Compression with Multi-ECC: Enhanced Error Resiliency for Magnetic Memories," MEMSYS'19 Proceedings of the International Symposium on Memory Systems, pp. 85-100, Sep. 2019.

(Continued)

*Primary Examiner* — Shelly A Chase
(74) *Attorney, Agent, or Firm* — Potomac Law Group, PLLC

(57) ABSTRACT

Disclosed are methods, systems, devices, circuits. and other implementations, including a method for error identification and correction that includes obtaining from a memory device coded input data, the coded input data previously encoded by multiplying a source data element by a pre-determined multiplier, and stored in the memory device, and performing a decoding operation on the coded input data obtained from the memory device, with the decoding operation including at least a modulo operation, to derive a resultant decoded data element and a remainder portion. The method further includes determining whether the coded input data includes a corrupted portion based on a value of the remainder portion.

31 Claims, 8 Drawing Sheets

(56) References Cited

U.S. PATENT DOCUMENTS

| | | | |
|---|---|---|---|
| 2014/0229786 | A1* | 8/2014 | Poolakkaparambil ...................... G06F 11/1402 714/746 |
| 2016/0315635 | A1 | 10/2016 | Cai et al. |
| 2018/0034483 | A1* | 2/2018 | Graumann .......... G06F 11/1068 |
| 2019/0253078 | A1* | 8/2019 | Goettfert ............... H03M 13/15 |
| 2019/0356331 | A1 | 11/2019 | Kim et al. |
| 2020/0081776 | A1 | 3/2020 | Briat et al. |
| 2022/0091936 | A1* | 3/2022 | La Fetra ............. G06F 11/1076 |

OTHER PUBLICATIONS

Avizienis et al., "Arithmetic Error Codes: Cost and Effectiveness Studies for Application in Digital System Design," IEEE Transactions on Computers, vol. C-20, Issue 11, pp. 1322-1331, Nov. 1971.
Avizienis et al., "The STAR (Self-Testing And Repairing) Computer: An Investigation of the Theory and Practice of Fault-Tolerant Computer Design," IEEE Transactions on Computers, vol. C-20, No. 11, pp. 1312-1321, Nov. 1971.
Barrett, "Implementing the Rivest Shamir and Adleman Public Key Encryption Algorithm on a Standard Digital Signal Processor," Conference on the Theory and Application of Cryptographic Techniques, pp. 311-323, 1986.
Barrows, "A New Method for Constructing Multiple Error Correcting Linear Residue Codes," University of Illinois, Thesis, 1966.
Bernstein et al., "Linear Codes for Single Error Correction in Symmetric and Asymmetric Computational Processes," IRE Transactions on Information Therapy, vol. 8, No. 1, pp. 29-34, Jan. 1962.
Binkert et al., "The gem5 simulator," ACM SIGARCH Computer Architecture News, vol. 39, No. 2, pp. 1-7, 2011.
Bose et al., "On A Class of Error Correcting Binary Group Codes," Information and Control, vol. 3, pp. 68-79, Mar. 1960.
Brown, "Error Detecting and Correcting Binary Codes for Arithmetic Operations," IRE Transactions on Electronic Computers, vol. EC-9, Issue 3, pp. 333-337, Sep. 1960.
Bucek et al., "Spec CPU2017—Next-Generation Compute Benchmark ," Companion of the 2018 ACM/SPEC International Conference on Performance Engineering, pp. 41-42, Apr. 2018.
Cassagne et al., "MIPP: a Portable C++ SIMD Wrapper and its use for Error Correction Coding in 5G Standard," WPMVP'18 Proceedings of the 6th Workshop on Programming Models for SIMD/Vector Processing, Article No. 2, Feb. 2018.
Chen et al., "CARE: Coordinated Augmentation for Elastic Resilience on DRAM Errors in Data Centers," 2021 IEEE International Symposium on High-Performance Computer Architecture, pp. 553-544, 2021.
Chen et al., "Error-Correcting Codes for Semiconductor Memory Applications: A State-of-the-Art Review," IBM Journal of Research and Development, vol. 28, No. 2, pp. 124-132, Mar. 1984.
Chen et al., "MemGuard: A low cost and energy efficient design to support and enhance memory system reliability," 2014 ACM/IEEE 41st International Symposium on Computer Architecture, pp. 49-60, 2014.
Chien et al., "On linear residue codes for burst-error correction," IEEE Transactions on Information Theory, vol. 10, No. 2, pp. 127-133, Apr. 1964.
Cojocar et al., "Exploiting Correcting Codes: On the Effectiveness of ECC Memory Against Rowhammer Attacks," 2019 IEEE Symposium on Security and Privacy, pp. 55-71, 2019.
Costan et al., "Intel SGX Explained," IACR Cryptol. ePrint Arch., vol. 2016, No. 86, pp. 1-118, 2016.
Dawe et al., "Thermoelectric Outer Planets Spacecraft (TOPS) Electronic Packaging and Cabling Development Summary Report," National Aeronautics and Space Administration, Dec. 1974.
Erozan et al., "An EG-LDPC Based 2-Dimensional Error Correcting Code for Mitigating MBUs of SRAM Memories," FPGAworld '15 Proceedings of the 12th FPGAworld Conference, pp. 21-26, Sep. 2015.

Fog, "4. Instruction tables, Lists of instruction latencies, throughputs and micro-operation breakdowns for Intel, AMD and VIA CPUs" Technical University of Denmark, 2022.
Forin, "Vital Coded Microprocessor Principles and Application for Various Transit Systems," IFAC Proceedings vols. vol. 23, Issue 2, pp. 79-84, Sep. 1990.
Frey, "Safety of Computer Control Systems," SAFECOMP'92: Computer Systems in Safety-Critical Applications, Elsevier, 2014.
Fruehe, "AMD EPYC Brings New RAS Capability, " Moor Insights and Strategy, Jun. 2017.
Gong et al., "CLEAN-ECC: High Reliability ECC for Adaptive Granularity Memory System," 48th Annual IEEE/ACM International Symposium on Microarchitecture, pp. 611-622, 2015.
Gong et al., "DUO: Exposing On-chip Redundancy to Rank-Level ECC for High Reliability," 2018 IEEE International Symposium on High Performance Computer Architecture, pp. 683-695, 2018.
Granlund et al., "Division by Invariant Integers using Multiplication," Proceedings of the ACM SIGPLAN 1994 Conference on Programing Language Design and Implementation, pp. 61-72, 1994.
Gumpertz, "Combining Tags with Error Codes," Proceedings of the 10th Annual International Symposium on Computer Architecture, pp. 160-165, 1983.
Hamming, ":Error detecting and error correcting codes," The Bell System Technical Journal, vol. 29, Issue 2, pp. 147-160, Apr. 1950.
Henderson, "POWER8® Processor-Based Systems RAS Introduction to Power Systems™ Reliability, Availability, and Serviceability," IBM, Jan. 2016.
Henderson, "Residue Class Error Checking Codes," Proceedings of the 1961 16th ACM National Meeting, pp. 132.101-132.104, 1961.
Hsiao et al., "Application of Error-Correcting Codes in Computer Reliability Studies," IEEE Transactions on Reliability, vol. R-18, No. 3, pp. 108-118, 1969.
Hsiao, "A Class of Optimal Minimum Odd-weight-column SEC-DED Codes," IBM Journal of Research and Development, vol. 14, No. 4, pp. 395-401, 1970.
Huang et al., "IVEC: Off-Chip Memory Integrity Protection for Both Security and Reliability," ACM SIGARCH Computer Architecture News, vol. 38, No. 3, pp. 395-406, 2010.
Jeong et al., "PAIR: Pin-aligned In-DRAM ECC architecture using expandability of Reed-Solomon code," 2020 57th ACM/IEEE Design Automation Conference, pp. 1-6, 2020.
Jian et al., "Low-power, Low-storage-overhead Chipkill Correct via Multi-line Error Correction," Proceedings of the International Conference on High Performance Computing, Networking, Storage, and Analysis, 2013.
Jiang, "Machine Learning and Algorithmic Techniques for Error Correction," 2018 Information Theory and Applications Workshop (ITA), Feb. 2018.
Kaplan et al., "AMD Memory Encryption," 25th USENIX Security Symposium, Aug. 2016.
Karpovsky et al., "Robust Protection against Fault-Injection Attacks on Smart Cards Implementing the Advanced Encryption Standard," International Conference on Dependable Systems and Networks, pp. 93-101, 2004.
Kim et al., "All-Inclusive ECC: Thorough End-to-End Protection for Reliable Computer Memory," 2016 ACM/IEEE 43rd Annual International Symposium on Computer Architecture, pp. 622-633, 2016.
Kim et al., "Bamboo ECC: Strong, safe, and flexible codes for reliable computer memory," IEEE 21st International Symposium on High Performance Computer Architecture (HPCA), Feb. 2015.
Kim et al., "Flipping Bits in Memory Without Accessing Them: An Experimental Study of DRAM Disturbance Errors," 2014 ACM/IEEE 41st International Symposium on Computer Architecture, pp. 361-372, 2014.
Kim et al., "Frugal ECC: Efficient and Versatile Memory Error Protection through Fine-Grained Compression," Proceedings of the International Conference for High Performance Computing, Networking, Storage and Analysis, Article No. 12, Nov. 2015.
Kraft et al., "Improving the error behavior of DRAM by exploiting its Z-channel property," 2018 Design, Automation Test in Europe Conference Exhibition, pp. 1492-1495, 2018/.

(56) References Cited

OTHER PUBLICATIONS

Lee et al., "Hardware Architecture and Software Stack for PIM Based on Commercial DRAM Technology : Industrial Product," 2021 ACM/IEEE 48th Annual International Symposium on Computer Architecture, pp. 43-56, 2021.
Lemire et al., "Faster Remainder by Direct Computation Applications to Compilers and Software Libraries," Software: Practice and Experience, vol. 49, No. 6, pp. 953-970, 2019.
Liljestrand et al., "PAC it up: Towards Pointer Integrity using ARM Pointer Authentication," 28th USENIX Security Symposium, pp. 177-194, 2019.
Luby et al., "Mobile data broadcasting over MBMS tradeoffs in forward error correction," MUM'06 Proceedings of the 5th International Conference on Mobile and Ubiquitous Multmedia, p. 10-es, Dec. 2006.
Madalin et al., "Unidirectional error detection, localization and correction for DRAMs: Application to on-line DRAM repair strategies," 2011 IEEE 17th International On-Line Testing Symposium, pp. 264-269, 2011.
Magalhaes et al., "PHICC: an error correction code for memory devices," SBCCI'19 Proceedings of the 32nd Symposium on Integrated Circuits and Systems Design, Article No. 1, Aug. 2019.
Mandelbaum,"Arithmetic codes with large distance," IEEE Transactions on Information Theory, vol. 13, No. 2, pp. 237-242, Apr. 1967.
Martins et al., "Open Cell Library in 15nm FreePDK Technology," 2015 Symposium on International Physical Design, pp. 171-178, 2015.
Mukherjee, "Architecture Design for Soft Errors," Morgan Kaufman Publishers, 2008.
Nair et al., "XED: Exposing On-Die Error Detection Information for Strong Memory Reliability," 2016 ACM/IEEE 43rd Annual International Symposium on Computer Architecture, pp. 341-353, 2016.
Oh et al., "A 3.2 Gbps/pin 8 Gbit 1.0 V LPDDR4 SDRAM With Integrated ECC Engine for Sub-1 V DRAM Core Operation," IEEE Journal of Solid-State Circuits, vol. 50, No. 1, pp. 178-190, 2014.
Palframan et al., "COP: To Compress and Protect Main Memory," ACM/IEEE 42nd Annual International Symposium on Computer Architecture, pp. 682-693, 2015.
Park et al., "Exploiting error-correcting codes for cache minimum supply voltage reduction while maintaining coverage for radiation-induced soft errors," Proceedings of the IEEE 2014 Custom Integrated Circuits Conference, pp. 1-4, 2014.
Patel et al., "Bit-Exact ECC Recovery (BEER): Determining DRAM On-Die ECC Functions by Exploiting DRAM Data Retention Characteristics," 53rd Annual IEEE/ACM International Symposium on Microarchitecture (MICRO), pp. 282-297, 2020.
Qi et al., "CDF-LDPC: A New Error Correction Method for SSD to Improve the Read Performance," ACM Transactions on Storage, vol. 13, Issue 1, Article 7, Feb. 2017.
Qureshi et al., "Operating SECDED-based caches at ultra-low voltage with FLAIR," 43rd Annual IEEE/IFIP International Conference on Dependable Systems and Networks (DSN), pp. 1-11, 2013.
Reed,"Polynomial Codes Over Certain Finite Fields," vol. 8, No. 2, pp. 300-304, Jun. 1960.
Saileshwar et al., "SYNERGY: Rethinking Secure-Memory Design for Error-Correcting Memories," 2018 IEEE International Symposium on High Performance Computer Architecture, pp. 454-465, 2018.
Sasaki et al., "Practical Byte-Granular Memory Blacklisting using Califorms," Proceedings of the 52nd Annual IEEE/ACM International Symposium on Microarchitecture, pp. 558-571, 2019.
Sazeides et al., "Implicit-Storing and Redundant-Encoding-of-Attribute Information in Error-Correction-Codes," 46th Annual IEEE/ACM International Symposium on Microarchitecture, pp. 160-171, 2013.
Shafiee et al., "MemZip: Exploring Unconventional Benefits from Memory Compression," IEEE 20th International Symposium on High Performance Computer Architecture, pp. 638-649, 2014.
Son et al., "CiDRA: A Cache-inspired DRAM Resilience Architecture," 2015 IEEE 21st International Symposium on High Performance Computer Architecture, pp. 502-513, 2015.
Stein, "Prime-residue error correcting codes (Corresp.)," IEEE Transactions on Information Theory, vol. 10, No. 2, p. 170, Apr. 1964.
Stephan et al., "Optimizing Memory Performance of Intel Xeon E7 v2-based Servers," Lenovo Press, 2013.
Sullivan, "Application of Residue Codes for Error Detection in Modern Computers," Master's thesis, The University of Texas at Austin, Dec. 2010.
Taassori et al., "Compact Leakage-Free Support for Integrity and Reliability," Proceedings of the ACM/IEEE 47th annual International Symposium on Computer Architecture, pp. 735-748, 2020.
Udipi et al., "LOT-ECC: LOcalized and Tiered Reliability Mechanisms for Commodity Memory Systems," 2012 39th Annual International Symposium on Computer Architecture, pp. 285-296, 2012.
Unknown, "15nm Open-Cell Library and 45nm FreePDK," I.Silicon Integration Initiative, https://si2.org/open-cell-library, 2024.
Unknown, "2Gb (x16 x 1 channel) Mobile LPDDR4/LPDDR4X with ECC," Integrated Silicon Solution, Inc., 2020.
Unknown, "Armv8.5-A Memory Tagging Extension," ARM, White paper, 2018.
Unknown, "BIOS and Kernel Developer's Guide (BKDC) for AMD Family 15H Models 00h-0Fh Processors," Advanced Micro Devices, Jan. 2013.
Unknown, "JES79-5 SDRAM," JEDEC Solid State Technology Assoc., 2020.
Unknown, "Memory RAS Configuration—User's Guide," SuperMicro, Inc., Revision 1, 2017.
Unknown, "POWER9 Processor's User's Manual," IBM, Oct. 2019.
Unknown, "Quad-Core Intel® Xeon® Processor 5400 Series," Intel Inc., Aug. 2008.
Wallace, "A Suggestion for a Fast Multiplier," IEEE Transactions on Electronic Computers, vol. EC-13, No. 1, pp. 14-17, 1964.
Wilkerson, "Trading off Cache Capacity for Reliability to Enable Low Voltage Operation," 2008 International Symposium on Computer Architecture, pp. 203-214, Jun. 2008.
Woodruff et al., "The CHERI capability model: Revisiting RISC in an age of risk," in Proceeding of the 41st Annual International Symposium on Computer Architecture (ISCA),pp. 457-468, 2014.
Yim, "The Rowhammer Attack Injection Methodology," IEEE 35th Symposium on Reliable Distributed Systems, pp. 1-10, 2016.
Yoon et al., "Memory mapped ECC: low-cost error protecto8infor last level caches," ACM SIGARCH Computer Architecture News, vol. 37, No. 3, pp. 116-127, Jun. 2009.
Yoon et al., "Virtualized and flexible ECC for main memory," ASPLOS Xv: Proceedings of the fifteenth International Conference on Architectural Support for Programming Languages and Operating Systems, pp. 397-408, Mar. 2010.
Ziad et al., "ZeRØ: Zero-Overhead Resilient Operation Under Pointer Integrity Attacks," 2021 ACM/IEEE 48th Annual International Symposium on Computer Architecture, pp. 999-1012, 2021.

* cited by examiner

SYSTEMS AND METHODS FOR MULTI-USE ERROR CORRECTING CODES

CROSS-REFERENCE TO RELATED APPLICATIONS

This application claims the benefit of, and priority to, U.S. Provisional Application No. 63/215,154, entitled "MUSE: MULTI-USE ERROR CORRECTING CODES," and filed Jun. 25, 2021, the content of which is incorporated herein by reference in its entirety.

BACKGROUND

Error correcting codes (ECCs) are procedures/algorithms that detect errors in data by encoding and decoding redundant information alongside the data. ECCs are widely used in numerous digital applications, including computers and servers, to ensure data protection. In general, ECC methods suffer a tradeoff between error correction rate (efficacy) and memory usage (energy/cost). To minimize storage and transmission overheads, codes that use fewer redundancy bits for a desired level of reliability and are easy to implement have gained widespread use.

Residue codes are a specific type of ECC used for detecting and correcting errors that generally happen during computation. Unlike storage-oriented codes like Reed Solomon codes, residue codes have a helpful property that the error correction information is computed in parallel with computational operations: say e is the ECC function, and $f$ is the computational function, then for residue codes, $e(f(x, y))=f(e(x);e(y)))$ for some common functions $f$. In contrast, for storage-oriented codes, $e(f(x,y))$ can be calculated only after $f(x,y)$ is computed.

SUMMARY

The present disclosure is directed to an error correcting code approach, referred to as MUSE (Multi-Use) ECC (Error Correcting Code), or simply MUSE, which is based on residue codes implementations, and provides a level protection similar to storage oriented codes but with fewer bits of storage. These saved bits can be used for storing metadata in a manner that also protects the metadata itself. As compute and memory are merging, and security and reliability places more demands on memory, efficient codes, such as MUSE, not only offer a path for better integration of computing and memory components, but also enable security techniques that need metadata to be incorporated in a better manner into existing systems.

In MUSE implementations described herein, a data element is multiplied with a specifically chosen multiplier before storing it into memory. Upon retrieval, the stored coded data element is divided by the multiplier (or alternatively undergoes equivalent processing, such as multiplying the retrieved coded data with the multiplier's inverse. Since the data was multiplied by a fixed multiplier, it is expected that the value retrieved from memory have a remainder of zero in the case of no corruption (i.e., no flipped bits). If some bits were flipped, the remainder value can be used to identify those flipped bits and restore their original value.

One challenge of using conventional residue error correcting codes is that the memory has to accommodate failure models where multiple bits can fail. In this case, the number of remainders grows exponentially with the number of errors and the multiplier values become too large for practical use. In the approaches and solutions described herein, this problem is overcome through shuffling and atomization optimizations described in greater detail below. Briefly, under the shuffling and atomization optimizations, bit positions of the multiplied data are changed before the coded data is written to memory, thus changing the distribution of integer values representing the data and the errors. Because the remainders are directly related to the integer values of the errors, by changing bit order, the chances to find a multiplier are increased. These simple optimizations allow adapting the MUSE codes described herein to memory systems.

The proposed solutions described herein implement a computationally efficient error coding scheme. The proposed coding approaches pose a challenge for memory systems (and/or computing systems) in that a naïve implementation of the MUSE coding scheme could be computationally prohibitive in terms of performance, as it requires expensive multiplication and division operations on the critical path from memory. For instance, a naïve division process can take up to 70 cycles. The proposed solutions of the MUSE approach avoid these costs by taking advantage of the fact that general-purpose multipliers and dividers do not need to be used since the MUSE multiplier is fixed and known at design time. As a result, the encoding and decoding processes can be implemented using specialized multiplication, division and modulo operations, which substantially reduces the latencies of those operations and take them off the critical path. These optimizations allow the adoption of residue codes for use with modern memory systems, and offer three major benefits:

- MUSE uses fewer bits of storage than comparable Reed-Solomon codes. MUSE corrects multi-bit errors confined to a single DRAM chip on a DIMM, allowing the system to withstand a permanent memory chip failure with at least four fewer redundancy bits than Reed-Solomon codes used in enterprise systems. These saved bits can be used to implement ARM Memory Tagging Extensions, saving up to 3% of DRAM power consumption, or can be used to store cryptographic hashes that reduce the probability of successful Rowhammer attack to $(1-2^{-40})$.
- MUSE is a single code that can guarantee the correctness of both data in storage and during computation. MUSE is a promising fit for Processing In-Memory (a new emerging technology where computation happens near the data in memory). In the settings of PIM-enabled HBM2, MUSE could use 2.6× less redundancy bits than provisions specified in the standard, while protecting the data during both storage and computation without the need of multiple reliability schemes.
- MUSE offers customization of codes to fit error models. The MUTE approach can cover two classes of errors simultaneously: (1) single-bit errors and (2) asymmetrical errors (i.e., errors due to lack of refresh) confined to a single DRAM chip on a DIMM. MUSE codes are showcased for this model, which uses three fewer check bits than Reed-Solomon code.

Thus, in some variations, a method for error identification and correction is provided that includes obtaining from a memory device coded input data, the coded input data previously encoded by multiplying a source data element by a pre-determined multiplier, and stored in the memory device, and performing a decoding operation on the coded input data obtained from the memory device, with the decoding operation including at least a modulo operation, to derive a resultant decoded data element and a remainder portion. The method further includes determining whether the coded input data includes a corrupted portion based on a value of the remainder portion.

Embodiments of the method may include at least some of the features described in the present disclosure, including one or more of the following features.

The method may further include correcting the decoded data element, in response to a determination that the remainder portion has a nonzero value, to determine a corrected data element.

Correcting the decoded data element may include correcting, based on the remainder portion, the decoded data that was modified at an earlier time instance as a result of a multi-bit error that occurred to an original coded data stored at the memory device.

Correcting the decoded data may include searching an error correction table comprising a plurality of entries for different remainder values associated with the pre-determined multiplier, with each of the plurality of entries including a remainder field with a respective remainder value, an error field with a respective error value, and a sign field with a sign value indicating the sign of the error value, and combining, in response to matching the nonzero remainder to the remainder value for one of the plurality of entries, the sign value for the one of plurality of entries with a corresponding error value for the one of the plurality of entries to yield a signed error value, and adding the signed error value to the decoded data element to yield a corrected data value.

Performing the modulo operation may include multiplying the coded input data by an inverse multiplier, determined from the pre-determined multiplier, to derive the resultant decoded data element.

Multiplying the coded input data by the inverse multiplier may include applying a Booth encoder to generate partial products for a multiplication operation performed on the coded input data and the inverse multiplier, processing the generated partial products with a Wallace tree procedure to perform summation of the partial products to derive summed partial products, and adding the summed partial products to derive the resultant decoded data element.

The pre-determined multiplier may be derived by identifying symbol representations for a code set comprising a plurality of code symbols, computing error values for each possible representation error for each of the plurality of code symbols, and determining the pre-determined multiplier for which each of a plurality of resultant remainder values, resulting from the modulo operation applied to the computed error values, is unique.

Identifying symbol representations may include shuffling one or more portions of a first symbol representation with another one or more portions of a second symbol representation such that a range of error values resulting from the shuffling is smaller than an initial error range for an initial symbol representation for the code set.

The method may further include assigning to at least two of the computed error values a single remainder value, with each of the at least two of the computed error values resulting from an error associated with one or more particular bit locations of at least one of the symbol representations for the code set.

The method may further include dividing at least one of the symbol representations into multiple smaller virtual groups of symbol representations, and applying one or more symbol optimization techniques to the each of the multiple smaller virtual groups of symbol representations to determine the pre-determined multiplier.

The coded input data previously encoded and stored in the memory device may include one or more bits not required for decoding the coded input data, with the one or more bits being utilized for non-coding functionality.

The non-coding functionality may include one or more of, for example, memory tagging, and/or rowhammer detection.

In some variations, a computing system is provided that includes a memory device, and a controller circuit in communication with the memory device. The controller circuit is configured to obtain, from the memory device, coded input data, the coded input data previously encoded by multiplying a source data element by a pre-determined multiplier, and stored in the memory device, and perform a decoding operation on the coded input data obtained from the memory device, with the decoding operation including at least a modulo operation, to derive a resultant decoded data element and a remainder portion. The controller circuit is further configured to determine whether the coded input data includes a corrupted portion based on a value of the remainder portion.

In some variations, a non-transitory computer readable media is provided that includes computer instructions, executable on a processor-based device, to obtain from a memory device coded input data, the coded input data previously encoded by multiplying a source data element by a pre-determined multiplier, and stored in the memory device, perform a decoding operation on the coded input data obtained from the memory device, with the decoding operation including at least a modulo operation, to derive a resultant decoded data element and a remainder portion, and determine whether the coded input data includes a corrupted portion based on a value of the remainder portion.

Embodiments of the system and the computer-readable media may include at least some of the features described in the present disclosure, including at least some of the features described above in relation to the method.

Other features and advantages of the invention are apparent from the following description, and from the claims.

BRIEF DESCRIPTION OF THE DRAWINGS

These and other aspects will now be described in detail with reference to the following drawings.

Like reference symbols in the various drawings indicate like elements.

DESCRIPTION

Figure 1:
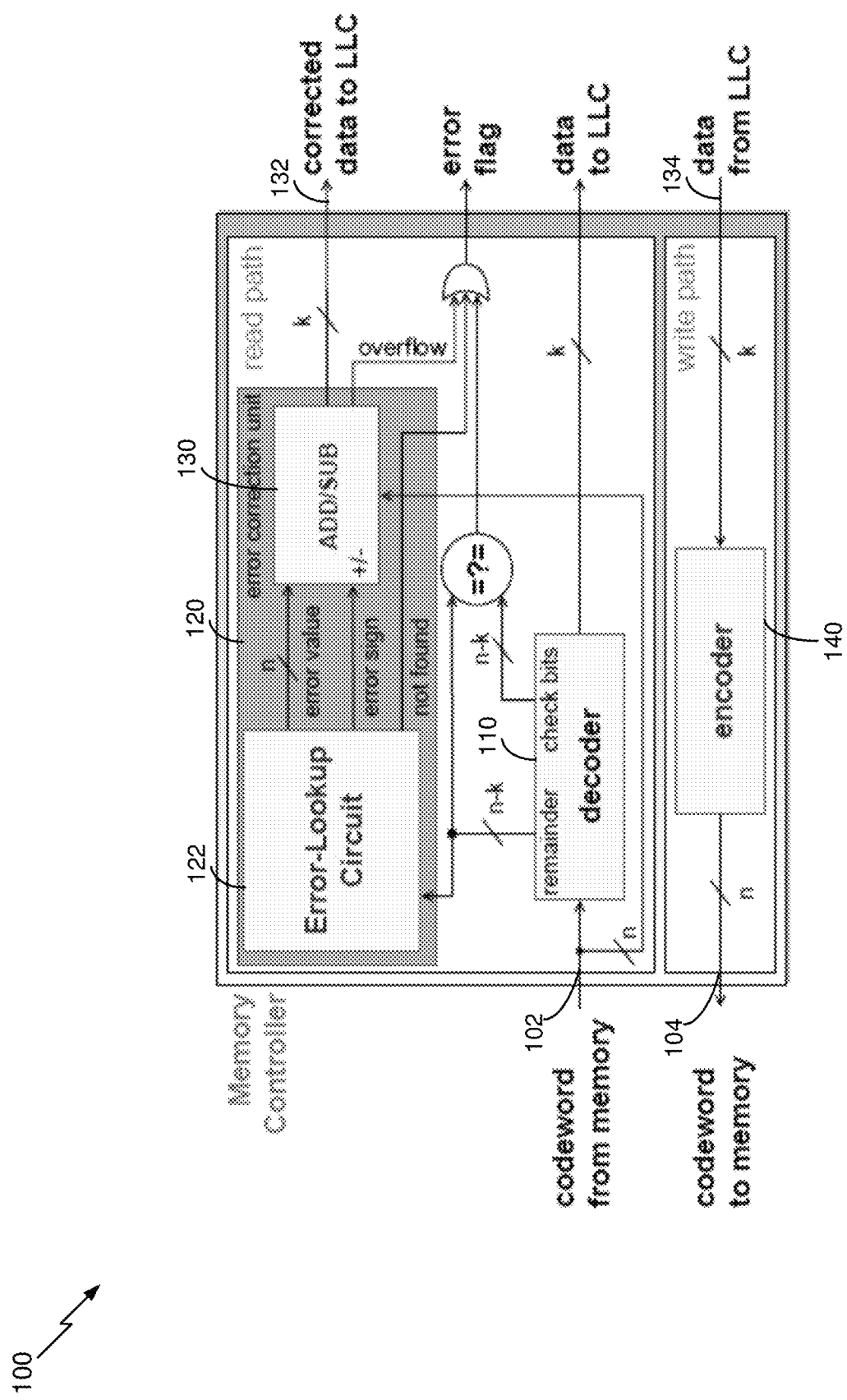
FIG. 1 is a schematic diagram of a memory controller implementing an error correction coding scheme for data stored on a memory device.

Disclosed are systems, methods, devices, and other implementations (including hardware, software, and/or a hardware-software hybrid implementations) for an ECC approach called MUSE (Multi-Use) ECC that uses simple multiplication and modulo operations (e.g., implemented through division operation using a pre-determined multiplier, multiplying a data element by an inverse of the pre-determined multiplier, or through other means) to provide reliable error correction rates with lower memory usage. In simulation models, MUSE ECC was shown to have uniform single- and multi-bit correction performance on par with traditional ECC methods, as well as extra memory states, reasonable area overhead, and negligible performance overhead. Particularly, the MUSE approach provides the same or better reliability as other ECCs, but spares memory space for other purposes, without compromising on performance, offers 100% single error correction and multi-bit effort detection between 70-82.8%, corrects failure of a single chip with parity bit space savings of approximately 12.5% compared to conventional methods, and utilizes innovative concepts of shuffling and aliasing to allow continuous optimization of the MUSE ECC approach and to free up more space. In addition to saving memory, MUSE ECC integrates easily into encrypted memory computation algorithms and procedures to improve data security. MUSE presents an exciting ECC option to replace the decades-old error correction frameworks that are currently used in technologies today.

The MUSE ECC approach is based on the use of simple mathematical operations of division, and can be broken down into three main operations: (1) multiplying data with a chosen, carefully derived, multiplier that is stored in memory, (2) dividing retrieved data by the selected multiplier, and (3) using the remainder to repair any incorrect data bits. Since data is multiplied by a fixed multiplier, the value retrieved from memory in step (2) is expected to have a remainder of zero in the case that no bits were flipped. If, however, the remainder is nonzero, then an error is deemed to have occurred, and the remainder is then used to pinpoint which bit was flipped and restore the data back to the original value. Thus, in various embodiments, a method for error identification and correction is provided that includes obtaining from a memory device coded input data, with the coded input data having previously been encoded by multiplying a source data element by a pre-determined multiplier, and stored in the memory device. The method also includes performing a decoding operation on the coded input data obtained from the memory device, with the decoding operation including at least a modulo operation, to derive a resultant decoded data element and a remainder portion, and determining whether the coded input data includes a corrupted portion based on a value of the remainder portion. The method may also include correcting the decoded data element, in response to a determination that the remainder portion has a nonzero value, to determine a corrected data element. For example, correcting the decoded data element may include correcting, based on the remainder portion, the decoded data that was modified at an earlier time instance as a result of a multi-bit error that occurred to an original coded data stored at the memory device.

The approaches described herein are developed based on the notion of symbols from storage-oriented codes in the context of residue codes. A specific class of multi-bit errors confined within a single s-bit-wide DRAM device is considered in the development of the MUSE codes. This class of errors is of interest because a codeword is striped across multiple DRAM chips on a DIMM, and if one chip fails, the corresponding part of the codeword will exhibit an s-bit error. Thus, a symbol is defined as a group of s bits written to a single DRAM device. Each s-bit symbol may have $2 \times (2^s - 1)$ possible errors—same as the number of ways for one s-bit number to become a different s-bit number. For example, for 4-bit symbols, a 4-bit value can be corrupted via 30 different errors, i.e., to become another value different than the original. Some of these error values are positive, and some are negative. If the initial data value was $0000_2$, it could have only 15 positive errors, while $1100_2$ would have three positive and twelve negative error values.

An important requirement of MUSE ECC is finding a suitable multiplier. A good multiplier is defined to be one such that after it is multiplied by the data to generate the codeword and the codeword is corrupted by at most n bits, then every possible remainder value maps to at most one error sequence. To facilitate the determination of multipliers to be used in the MUSE ECC approach, several new optimization techniques may be used, namely, shuffling, aliasing, and atomization, each of which will be discussed in greater detail below. These techniques allow for the selection of multipliers that achieve the goal of having an injective mapping between error sequences to remainder values to avoid ambiguity when correcting. Finding a multiplier such that this property holds is difficult if the distribution of bits in the codeword causes different error values to have the same remainder, leading to miss-correction. By shuffling the order of bits in a data symbol, the distribution of the error values can be changed to make it easier to find unique remainder values for a given multiplier. The aliasing technique takes advantage of the observation that for binary values, it does not matter what the direction of a bit flip is, i.e., 0 to 1 versus 1 to 0, since that can easily be inferred. That is, an error value of 1 and an error value of −1 provide the same level of information when correcting bits. This allows the use aliasing which groups the error values that have the same nonzero bits into the same equivalence class. For example, the error values [1;0;1], [−1;0;1], [1;0;4], and [−1;0; −1] are all associated with the same error sequence (errors in the first and third bits), despite having different remainders and error values. This lessens the requirements in the search for a good multiplier since those four error values do not need to be mapped to unique remainders. In the atomization technique, each symbol is divided symbol into sub-symbols, where each sub-symbol has sequentially assigned bits. As a result, a code may use long symbols with a modest number of required remainders while still allowing shuffling of bits.

As noted, MUSE ECC relies on two simple arithmetic concepts: multiplication and division of integers. First, data is encoded by multiplying it with some carefully chosen integer m. Upon reading the data from memory, the data is checked to determine if it has remained a multiple of m. If so, then no error has occurred, but if the data is not a multiple of m, then an error has occurred and a determination is made whether the error can be corrected. This process can be expressed by the following equations that describe how the data integer data is encoded into an integer codeword, decoded, and how the errors are detected and corrected.

$$\text{codeword} = m \times \text{data} \quad (1)$$

$$\text{remainder} = \text{codeword} \bmod m \quad (2)$$

$$\text{data} = \begin{cases} \text{codeword}/m & \text{remainder} = 0 \\ (\text{codeword} - \text{remainder})/m & \text{otherwise} \end{cases} \quad (3)$$

The data is encoded to codeword by multiplying data by m (Eq. 1). Upon reading the codeword, a check is made of the remainder of the codeword divided by m (Eq. 2). When the remainder is zero, the original data can be recovered simply by dividing the codeword by m (error-free case); otherwise the remainder r is subtracted to correct the error and then recover the data by dividing by m (Eq. 3).

The above formulation for encoding and decoding data elements presents a serious problem. Recovering the original data requires a division operation performed on the codeword. However, because the occurrence of error is, generally, an infrequent event (i.e., faults are not expected to be the common case), if the above formulation was to be implemented directly, it would result in a steep penalty for the common case of no errors. Accordingly, to avoid this costly overhead, in some embodiments encoding and recovery of a data item is performed by generating a codeword, for an original data item according to the following relationship:

$$\text{codeword} = \text{data} \times 2^{r_b} + X$$

$$X = m - (\text{data} \times 2^{r_b}) \bmod m \quad (4)$$

In the above formulation, $r_b$ are redundancy bits, data is the integer value of the data bits, and X is picked in such a way so that codeword mod m=0. By encoding the data item, data, using this approach, the data in the codeword is easily separated from the redundancy, i.e., X, and no integer division is required to recover the original value of the data item. This formulation is used in some of the embodiments of the error correction coding approaches described herein so that the data and the error correction bits can be stored separately (in a "systematic" manner).

In the MUSE framework, single-bit errors are handled as follows. When a memory error flips bits, it transforms codeword to be some other codeword. The difference between the original and erroneous codeword is referred to as the error value. However, unlike in traditional codes where single bit flip corresponds to a single error value, in residue codes a bit flip may have two error values: one for 0→1 bit flips, and the other for 1→0 bit flips. To illustrate, consider the following example using codeword (i.e., the decoded data item) whose integer value of 243 and its binary representation is $11110011_2$. Now assume that bit #1 (the bolded bit) is flipped and the codeword value becomes 1111 $0001_2$ or 241, leading to an error value of −2. Assume now that the codeword has an integer value of 972, or 0011 1100 $1100_2$. If the same bit #1 was flipped 0→1, corrupting the codeword to be 0011 1100 $1110_2$=974, the error value would be +2. Hence, single bit error may have two distinct error values and the value itself depends on the direction of the bit flip. To identify the corrupted bit and correct its value every bit in the word requires two distinct remainders. Note that both of those error values are integers powers-of-two: $-2=-1\times 2^1$ and $2=1\times 2^1$. Hence, in general, error at bit #i has error values of $E_i = \pm 2^i$, where + is for bit error 0→1, and − is for the error 1→0.

The construction of a code set and the multiplier may, in some embodiments, be performed as follows. The first step in code construction is to assign bits to symbols. The second step is to compute the error values for each possible error in all of the symbols in the word. This step is repeated for the remaining symbols in a word. Once all the error values are computed, the multiplier m is determined such that every error value has a distinct remainder.

To construct MUSE ECC, one must find one a good integer m so that all the error remainders are distinct (the process of construction a code set and determining a multiplier is generally performed during design time, rather than runtime). However, sometimes no good integers m are found because more than one error value maps to the same remainder. This problem can be mitigated through the shuffling optimization technique by changing the assignment of bits into symbols. This bit assignment change can result in a reduction of the range of possible error values for the different code symbols. Particularly, mod m is a periodic function, i.e., consecutive integer ranges [0: A−1; A:2×A−1; . . . ] map to the same interval [0; A−1]. MUSE ECC uses remainders to detect and correct errors, and thus, in the search for a code multiplier m, it would be desirable to make sure that computed error values are packed as densely as possible to decrease the chance of two different errors having identical remainders. For example, integers 10 and 11 are less likely to have identical remainders than 10 and 10000 (because both of them have several common multipliers). Therefore, error values should be as tightly packed as possible, to reduce the probability of getting two adjacent error values mapping to the same remainder. Consider the following example of the first two symbols in a codeword. The sequential assignment results in the following symbols and error values:

$$S_0(0,1) : \text{ErrValues} = [1,2,3,-1,-2,-3]$$

$$S_1(2,3) : \text{ErrValues} = [4,8,12,-4,-8,-12]$$

When bit #1 is placed (shuffled) into $S_1$, and bit #3 is placed into $S_0$, the following assignment and error values are generated:

$$S_0(0,3) : \text{ErrValues} = [1,8,9,-1,-8,-9]$$

$$S_1(2;1) : \text{ErrValues} = [4,2,6,-4,-2,-6]$$

With the new assignment, error values per symbol change, with the range of error values taken by the first two symbols shrinking from [1:12] to [1:9]. As a result, the density of error values increases. Moreover, with the sequential assignment, the error values bounds per symbol do not overlap, i.e., they increase as a monotonic sequence of non-overlapping ranges.

More generally, a multiplier m is determined by changing the assignment of bits into symbols, e.g., shuffling bits between the symbols, and consequently changing their respective error values, which often leads to fewer remainder collisions for a given multiplier. Shuffling leads to fewer remainder collisions partly because mod m is a periodic function, i.e., consecutive integer ranges [0: m−1]; [m:2m−1]; . . . , modulo m map to the same interval [0, m−1]. Ideally, all error values should be as close to each other as possible, thus minimizing remainder collisions.

Thus, each new shuffle results in the evaluation of a multiplier more than once, increasing the code search space. The combination of four static properties, namely, (1) multiplier m, (2) code length n, (3) symbols size s, and the (4) shuffle of bits into symbols, can define a MUSE code.

An example implementation of the shuffling optimization process is the following. On writes, a data item is encoded (into a codeword), shuffled, and stored into memory (e.g., a DRAM device). When reading the codeword back from memory, the codeword is first unshuffled, and then decoded. Thus, shuffling does not affect data correctness as it only redistributes the codeword bits while in storage. Moreover, the hardware support for shuffling is trivial as it requires only minor changes in signal routing between the chip IO and the memory controller, which should be done in a shuffled manner.

By shuffling codeword bits, an s-bit symbol error becomes a random s-bit error. In other words, each bit in the symbol has three possible states: (1) it was corrupted $1\rightarrow0$, (2) stayed the same, or (3) it was corrupted $0\rightarrow1$. Thus, an s-bit shuffled symbol error may have one of the $3^n-1$ possible error values.

Another optimization technique for MUSE ECC that can be used to reduce the number of remainders required by the code is that of remainder aliasing. In the symbol-based MUSE code each n-bit symbol has $3^n-1$ error values, and each one of those values requires a unique remainder. However, there are two issues with this approach: (1) the code will require a lot of remainders as n grows, and (2) the code will carry a lot of redundant information. To illustrate, assume an 8-bit symbols for 144-bit code. For this code, $(3^8-1)\times18=118,080$ remainders are needed, which will require multipliers larger than $2^{16}$, rendering such code impractical. Now, consider an example of a 4-bit symbol code with two error values [0,1,1,1] and [0,1,−1,1]. These different error values indicate that bits #2, #1, #0 were flipped. If such alias pairs can be detected, and multipliers can be found that that leave the same remainders for the aliased pairs, the number of unique remainders required can be substantially reduced, thus increasing the chance of finding multipliers.

Accordingly, under the aliasing optimization technique, different error values originating from the same set of flipped bits are allowed to have the same remainder. Without aliasing, a flip of a bit from 0 to 1 (i.e., $0\rightarrow1$), or from 1 to 0 (i.e., $1\rightarrow0$), will have different error values, and as a result a multi-bit ECC will require a very large multiplier value. To avoid this issue, the errors for the same set of flipped bits are allowed to have identical remainders. For example, 2-bit errors '01'$\rightarrow$'10' and '10'$\rightarrow$'01' may have the same remainder as long as they differ from all the other remainders. Essentially, with aliasing, the remainder will indicate that these two bits flipped, which is enough information to correct these specific bits.

A further optimization technique to facilitate the determination of a multiplier for implementing the MUSE ECC approach is that of atomization. The idea behind atomization is to enjoy the flexibility of shuffling the bits while reducing the number of required remainders per symbol. The atomization technique can be used to determine better codes by optimizing the granularity at which error correction is applied. For a symbol S, the symbol is divided into v sub-symbols (also referred to as virtual symbols) which do not have to be equally sized, with each sub-symbol having sequentially assigned bits. As a result, all the errors in a parent symbol are a linear combination of individual sub-symbol errors. This way, a code may use long symbols with a modest number of required remainders while still allowing shuffling of bits. The shuffling and aliasing optimizations can then be applied across these v virtual symbols. By reducing the symbols into atoms, the number of required code remainders is reduced because of the combinatorial property of the atomized code.

For example, consider an 8-bit symbol s. With shuffling, the total number of error values in the symbol is $3^8-1=6560$. By dividing s into two 4-bit sub-symbols with $e_i=2\times(2^4-1)=30$ error values each, and the total number of error is now $(30+1)^2-1=960$ error values, which is a 6.8× reduction.

In some examples, the selection process of a code set and the determination of multiplier to apply to the code set can be reduced by using an asymmetrical errors model. Under this model, only one erroneous transition is possible, i.e., $0\rightarrow1$ or $1\rightarrow0$, but not both. Asymmetrical errors are often used to describe retention errors in DRAM, i.e., lack of refresh. Without loss of generality, assume that only $1\rightarrow0$ errors are permissible. Thus, single bit error value must be a negative integer. Similar to symbol errors, asymmetrical symbol errors have error values as a combination of negative error values of individual bit flips within the symbol. This assumption cuts down the number of remainders by half, increasing the chances of finding a one-to-one mapping between errors and remainders.

Next, an example procedure for determining an appropriate multiplier is discussed. Process 1, provided below, is an example pseudocode implementation for finding code multipliers. The processor inputs are the code length n, the symbol size s, and redundancy budget $r_b$. The output is the list of multipliers (empty, if none are found) satisfying the code constraints, i.e., codeword size, symbol size, etc. Plausible codes satisfying these constraints (and thus can be deployed to encode data written to memory storage) are denoted as MUSE(n,k).

Process 1: Code Multiplier Search

```
input: r_b redundancy bits, s byte size, n code length
output: List of multipliers mult
1  S ← assignBitsToSymbols(s,n);
2  mults ← empty( );
3  R ← remaindersNeeded(s,n)
4  for odd m ∈ 2^{r_b} +1 to 2^{r_b+1} − 1 do
5      remSet ← empty( );
6      for S_i ∈ S do
7          for errPattern ∈ 1 to 2^s − 1 do
8              for errVal ∈ getErrVals(errPattern,S_i) do
9                  remSet:insert(errVal mod m);
10     if remSet.size( ) == R & 0 ∉ remSet then
11         mults.insert(m);
12 Function getErrVals(errPattern, S_i)
13     locErrVals ← empty( );
14     binPattern ← to_bin(errPattern);
15 for vec ∈ genAllVectors(binPattern) do
15         locErrVals.insert(vec · S_i);
17     return locErrVals;
```

The code multiplier search procedure starts (line 1) by assigning codeword bits to symbols, initializing an empty set of valid multipliers mults (line 2), and precomputing a required number of remainders for the code (line 3). For every multiplier m (line 4), the remainders for error values in the codeword are computed. For each error pattern (line 7) in symbol $S_i$ (line 6), error values errVal are computed (line 8) by calling getErrVals( )(lines 12-17). An empty (line 5) remainder set is filled with computed remainders (line 9) of each errVal. Remainders set size is compared to the required number R (line 10). If they match, and all the remainders are non-zero, the multiplier m is placed into a list of valid code multipliers (line 11). This procedure is repeated until all multipliers in the redundancy budget $r_b$ are checked.

To illustration the code construction process, five example MUSE codes for different error and system models are described, showcasing the flexibility and applicability of MUSE code in practical modern contexts. Code parameters, i.e., multipliers and shuffles, are summarized in Table 1 below. The notation (n,k) denotes a code that encodes k-bit of data into an n-bit codeword.

TABLE 1

Design parameters of example MUSE codes

| Code name | type | multiplier m | shuffle |
|---|---|---|---|
| MUSE(144,132) | O4B | 4065 | None |
| MUSE(80,69) | O4B | 2005 | None |
| MUSE(80,67) | O8A | 5621 | Equation 5 (below) |
| MUSE(80,70) | O4A_N1B | 821 | Equation 6 (below) |

To help classify the codes, the following naming convention is proposed, which is based on the error type covered by code: PST, where P denotes the error alignment form, S is the size of the error, and T is error type. Two types of errors (the T portion of the naming format) are supported: B—bidirectional, i.e., bit flips in both directions, and A—asymmetrical, i.e., bit flips in one direction only, i.e., retention errors in DRAM. Both types of S-bit errors may be either S-bit aligned—marked by O, or not aligned, i.e., any consecutive S-bit pattern, marked by N. For example, O4B code covers any 4-bit bidirectional error in the codeword, where each 4-bit error may start at bit #0, bit #4, etc., while N4B is a 4-bit errors that may start at any bit position. This naming approach highlights the flexibility of MUSE design. For instance, assume a code is designed that covers aligned 8-bit asymmetrical errors and any 1-bit bidirectional error. In this case, the code would be named O8A_O1B.

The first example code of Table 1 is the MUSE(144,132) Single Symbol Correct (SSC) Code. Server and enterprise settings often require a specific capability known as "ChipKill." Informally, ChipKill allows operation even when one or more DRAM chips on a DIMM completely fail. While the DDR5 standard had been finalized and devices are being sold, it is likely that older DDR4 devices will continue to be utilized for at least a few more years. The MUSE approach can be used to provide ECC for DDR4 DIMMs. Rather than designing for device failures, the failure protection/recovery strategy is designed we design for handling symbol failures, as symbols are at least as large as DRAM devices, and usually a multiple of the device sizes. Thus, SSC code guarantees to correct errors originating in at least a single device on a DIMM. To correct single device failure with x4 devices, the MUSE(144,132) code is used with a multiplier m=4065 and 4-bit symbols. Under the MUSE scheme, the data is striped across two DIMMs with eighteen x4 devices each, forming a 144-bit channel. Under these conditions, the MUSE code uses only twelve check bits for 132 bits of data. In contrast, a traditional Reed-Solomon code would use 16 check bits for 128 bits of data.

A second example code is the MUSE(80,69) SSC Code. Recently published DDR5 standard doubles the number of channels per DIMM, requiring two 40-bit memory channels per DIMM (32-bit data+8-bit parity). There are currently no commercially available DDR5 ECC DIMMs, and as such it is not clear how exactly the DIMMs will be configured. It is possible that they could be made of ten x4 devices per channel, for a total of 20 devices per DIMM; or five x8 devices per channel, for a total of ten devices per DIMM. Like in DDR4, a 4-bit symbol (80,69) code is designed with data striped across two channels. MUSE(80,69) code encodes 69-bit data into 80-bit codewords, using only eleven redundancy bits. With this code, by using only 64-bits for data, failure of one device on a DIMM can be corrected with five bits to spare. Alternatively, two consecutive device failures can be corrected with one bit to spare. In contrast, a traditional Reed-Solomon (80,64) code with x8 symbols will have no spare bits.

A third example code is MUSE(80,67) Single Device Correct Code. Suppose that a single device failure needs to be corrected, and it is undesirable to draw data from two channels on a DDR5 DIMM. Even in this case a MUSE code can be designed. Assuming asymmetrical errors, a code with 8-bit symbols can be designed for DDR5 DIMMs. For this code, sequential assignment of bits to symbols yields no multipliers of 16-bits or less. Thus, bits between symbols are shuffled. As a result, a multiplier m=5621 was determined for the following shuffle:

$$S_i^{i \in [0,9]} = [b_i, b_{10+i}, b_{20+i}, b_{30+i}, b_{40+i}, b_{50+i}, b_{60+i}, b_{70+i}] \quad (5)$$

This MUSE(80,67) code encodes 64 bits of data and three bits of metadata into an 80-bit codeword while correcting single device failure. To use this code over a 40-bit channel with 80-bit codewords, the codewords are split such that every beat writes half of the 8-bit symbol to memory (for all symbols).

A fourth example code is the MUSE(80,70) Single Device Correct Hybrid Code. To showcase the flexibility of the construction approach, a 4-bit symbol code is designed that handles two classes of errors: (1) asymmetrical symbol errors and (2) bidirectional single-bit errors. Codes that correct more than one type of error are referred to as Hybrid codes. As a result, the code encodes 64-bit data and 6-bit metadata items into 80-bit codewords and corrects two classes of errors. Code parameters are m=821 with the following shuffle:

$$S_{2 \times i} = [b_i, b_{10+i}, b_{20+i}, b_{30+i}], i \in [0,9]$$

$$S_{2 \times i+1} = [b_{40+i}, b_{50+i}, b_{60+i}, b_{70+i}], i \in [0,9] \quad (6)$$

Turning now to FIG. 1, a schematic diagram of a memory controller 100 implementing an error correction coding scheme for data stored on a memory device, is shown. The diagram of FIG. 1 provides high-level overview of how to integrate MUSE-based processing into a system. As depicted in FIG. 1, on the read path (commencing at point 102), for every word read from the main memory, a decoder 110 computes the remainder resulting from dividing a coded data item obtained (retrieved) from a memory device by a previously derived multiplier. The remainder is passed to an Error Lookup Circuit (ELC) 122 (included as part of an error correction unit 120) to determine whether an error has occurred. If the ELC provides a value to correct the data, error correction is performed by an error correction unit 130, and a Last Level Cache (LLC) reads the data (as indicated at output path 132). On the write path, the data is read from the LLC (at input point/terminal 134), encoded by an encoder 140, and transmitted to a memory device (at output point/terminal 104).

Figure 2A:
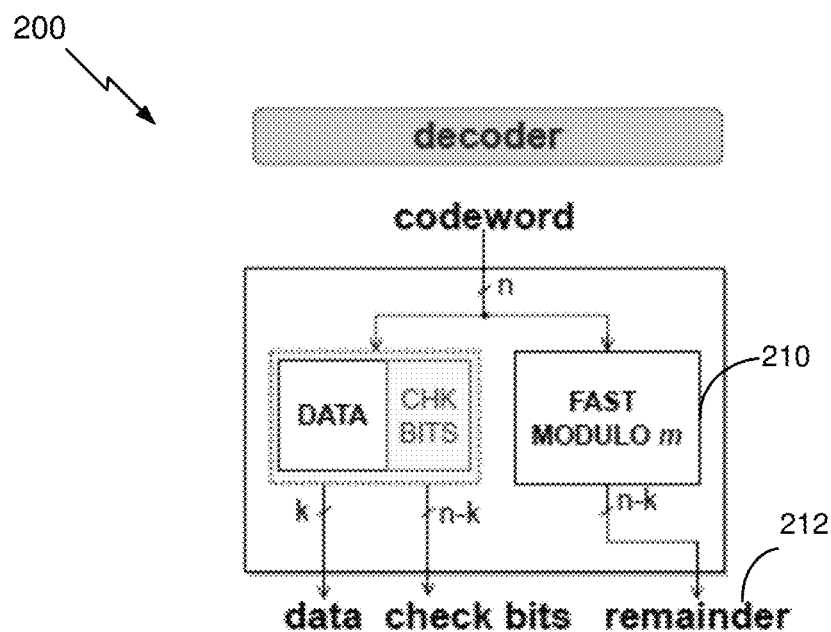
FIG. 2A is a schematic diagram of the microarchitecture configuration of a decoder.

FIG. 2A is a schematic diagram of the microarchitecture configuration of a decoder 200 (which may be similar to the decoder 110 of FIG. 1). The decoder 200 uses a fast modulo circuit 210 (discussed in greater detail below in relation to FIG. 4B) to compute the remainder 212 which is later used for error detection and correction. The decoder is systematic and enjoys the separability of the data and does not require division like in non-systematic residue codes.

Figure 2B:
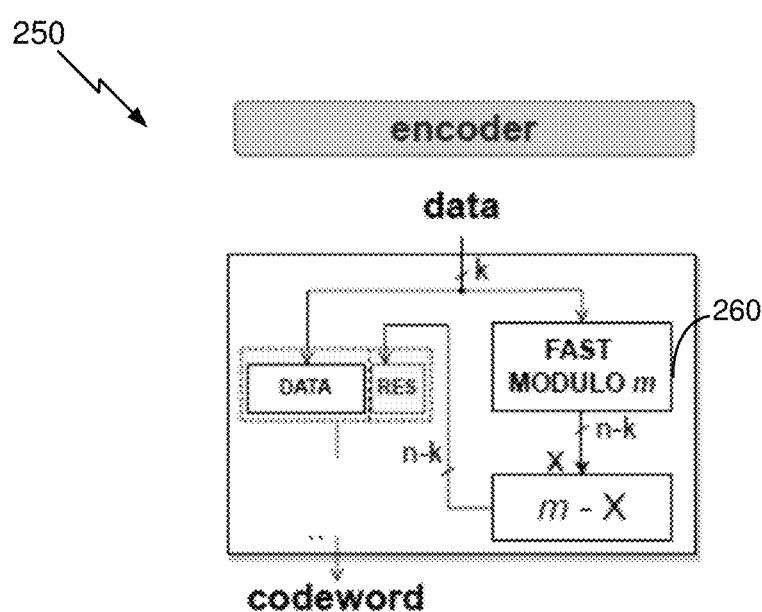
FIG. 2B is a schematic diagram of the microarchitecture configuration of an encoder.

FIG. 2B is a schematic diagram of the microarchitecture configuration of an encoder 250 (which may be similar to the decoder 140 of FIG. 1). To build the encoder 250, a fast modulo circuit 260, which may be the same or different than the fast modulo circuit 210 used by the decoder 200, is used. The encoder unit/circuit 250 operates similarly to the decoder unit 200 in the sense that, like the decoder unit/circuit 200, the encoder computes the residue of the data. However, unlike the decoder, the encoder 250 needs to compute the value of X (see Equation 4, above) to ensure that codeword mod m=0.

Turning back to FIG. 1, as illustrated the memory controller with integrated MUSE implementation implements the error correction unit 120 as an Error Lookup Circuit (ELC) 122 and an adder 124. Each entry in the ELC contains remainder, error value, and the sign bit for the adder. The remainder from the decoder is compared against the remainder field in the entry, and upon a match the error value is used to correct the error. The sign bit in the matched entry directs the adder to subtract or add the error value to the codeword. For example, MUSE(144,132) code with m=4065 error correction is built around ELC with 1080 entries and an adder. Each entry is 157 bits wide, where the first 12 bits are the remainder value, the next 144 bits is the error value, and the remaining single bit is the adder sign bit.

Figure 3:
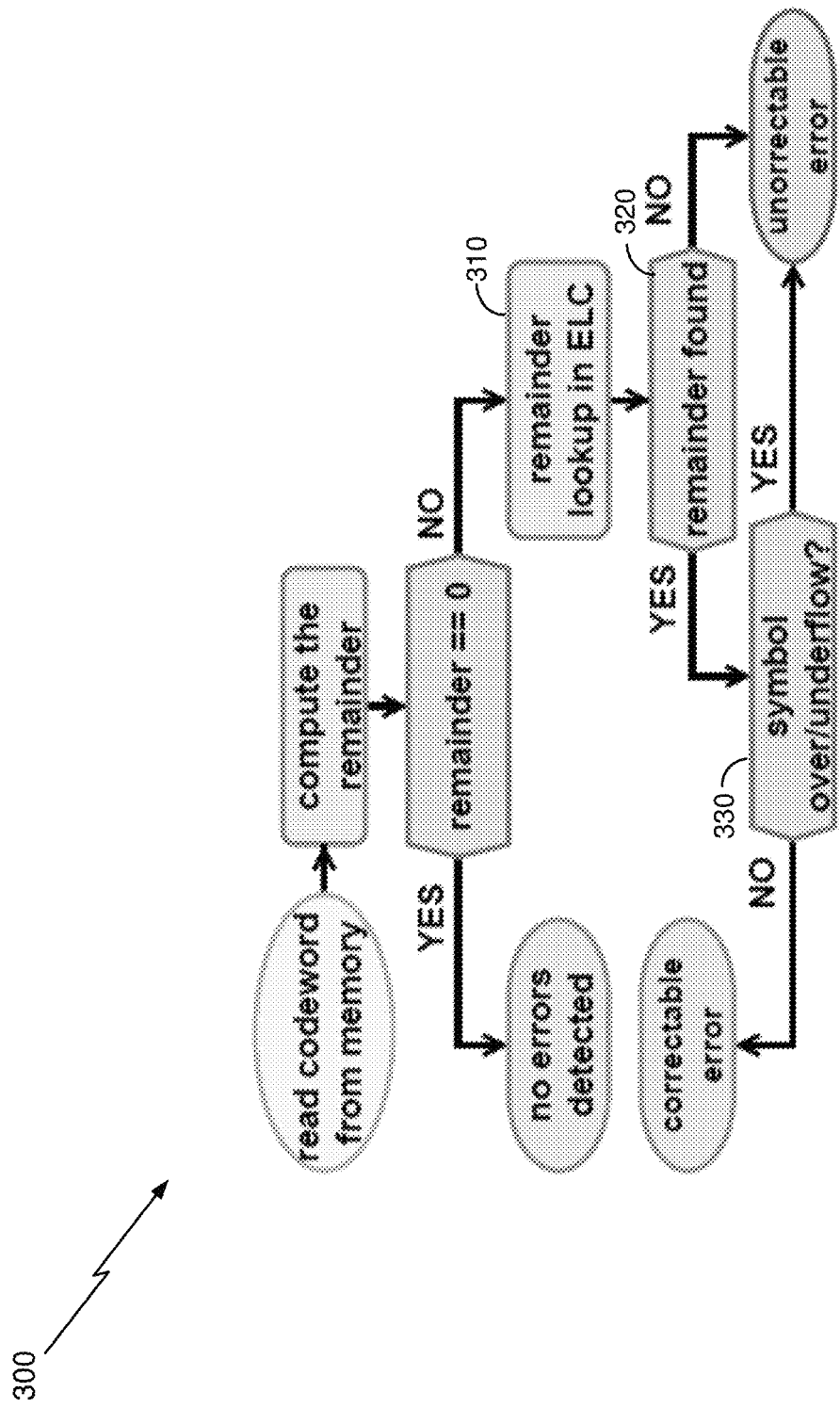
FIG. 3 is a flowchart of an error detection and correction procedure implemented using the MUSE approach.

FIG. 3 is a flowchart 300 of an error detection and correction procedure implemented under the MUSE approach. There are two ways to detect multi-symbol errors under the MUSE approach: (1) computed remainder not being present in ELC (as determined in operation 320 following a look-up operation 310), and (2) symbol-overflow/-underflow during error correction (performed by operation 330 depicted in FIG. 3). The first methodology relies on the fact that the code multiplier is greater than the number of remainders it generates, leading to some remainder values being unused. Thus, if ELC does not find the matching remainder entry, it will declare an uncorrectable multi-symbol error. The second detection methodology is based on the observation that errors are symbol-confined by design. Thus, if some mis-corrected multi-symbol errors cause flipping bits beyond the boundary of the corrected symbol, the multi-symbol error is detected. This method works because error correction is done with addition/subtraction, and in case of a multi-symbol error, it may cause a "ripple" of "1"s or "0"s beyond the symbol boundary.

To support the deployment of MUSE ECC, several microarchitectural modifications may be implemented to achieve overlap of operations that hide critical path latencies. The three interlinked arithmetical operations that the MUSE ECC approach requires are integer division, multiplication, and modulo. Both encoding and the decoding are done by computing the modulo (as detailed in Table 2, summarizing the arithmetic operations for codes).

TABLE 2

| Process | Operations |
| --- | --- |
| decode | $d = c >> r_b$ |
|  | $r = c \bmod m$ |
| encode | $r = c \bmod m$ |
|  | $c = d << rb - r$ | where $r_b$ is the bit budget for code redundancy, or $r_b = \lceil \log_2 m \rceil$ For the non-systematic variant of the code, multiplication is required for the encoding, while fast modulo and division by constant are the heart of the decoding process. The systematic code's decoding and encoding are done by computing the modulo. The non-systematic decoder performs integer division for data recovery and modulo for error detection/correction. However, even the fastest high-performance processors perform integer division in about 13-44 clock cycles for AMD ZEN, or 24-95 clock cycles in the case of the Intel Skylake-X. Two observations contribute to implementing a faster decoder: 1) a generic divider is not required (the same multiplier value is always used in division operations), and 2) division can be realized by using multiplication by the inverse of the multiplier instead of performing an actual division operation. As a result, the problem of designing a fast divider is reduced to implementing a fast multiplier by a constant.

Figure 4A:
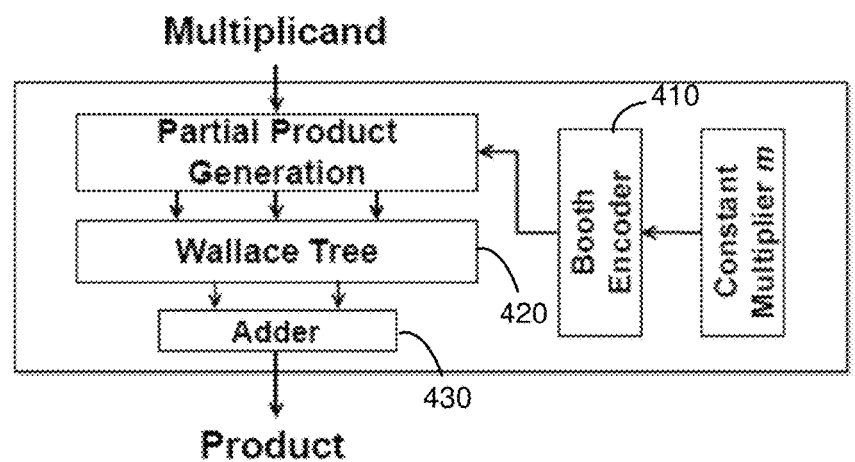
FIG. 4A is a schematic diagram of a multiplier with Booth encoding.

Generic integer multiplication of 64-bit operands is done in 3-4 cycles in most modern CPUs. However, because the codewords are at least 72b long, and decoding is on the critical path, a much faster multiplier is needed. To achieve this goal, a custom Wallace Tree multiplier based on Radix-4 Booth Encoders is implemented in some embodiments. The architecture of such a multiplier includes three components: (1) multiplier encoder with Radix-4 Booth Encoding (BE), that allows reducing the number of partial products by half, (2) a Wallace tree module that performs the summation of partial products, and (3) a final adder that produces the product. FIG. 4A is a schematic diagram of a multiplier 400 with Booth encoding, that includes a booth encoder 410, a Wallace Tree 420, and a final adder stage 430. The depth of the Wallace tree can be optimized even further by analyzing partial products. If some of the partial products are zero (0), they can be removed from the multiplier tree, thereby reducing the latency, hardware, and energy costs of the multiplier.

For example, for the MUSE(144,132) code, Booth Encoding of the inverse value has 73 partial products, 23 of which are equal to 0. By eliminating these, the depth of the Wallace tree is reduced by one level, thus reducing the latency by three XOR delays. Table 3 summarizes the multipliers, their inverses and shift amounts for the example MUSE codes listed in Table 1.

TABLE 3

| m | Inverse Value | Shift |
| --- | --- | --- |
| 4065 | 2247081238208645323191397344274727889999896 | 3156 bits |
| 2005 | 77178306688614730355307 | 87 bits |
| 5621 | 1761878725188230243585305 | 93 bits |
| 821 | 7539220702103412149202952b | 89 bits |

Figure 4B:
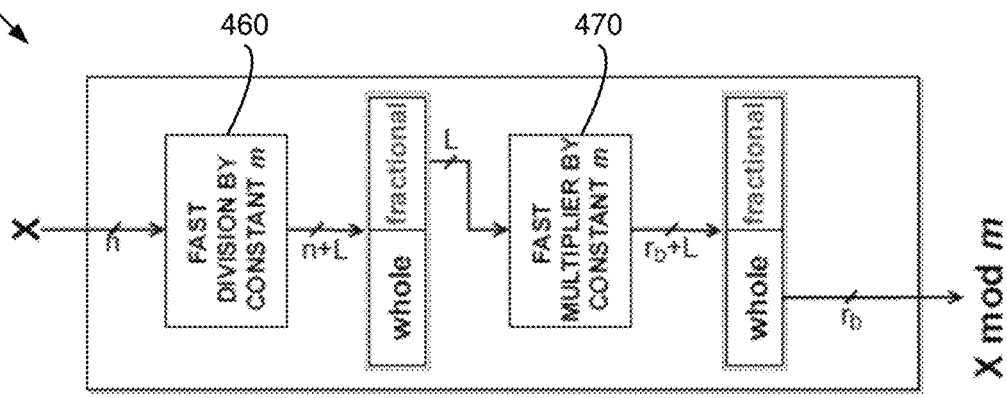
FIG. 4B is a schematic diagram of a direct remainder computational unit.

A naïve approach for computing the remainder (resulting from performing c mod m operation) is through computation of $r = c - m \times [c/m]$, where the division may be a multiplication with the inverse. As a result, the latency of the modulo operation is the latency of two multiplications and one subtraction, which can be done in 7 cycles on a modern CPU. However, the modulo operation can be computed even faster. The idea is based on using discarded bits from the first multiplication by the inverse. The value, represented by these bits, is multiplied by the code multiplier m and the upper $r_b$ bits are equal to the result of modulo. FIG. 4B is a schematic diagram of a direct remainder computational unit 450 implementing this scheme with two cascaded multipliers 460 and 470 performing consecutive multiplication operations. The second multiplier 470 is much faster than the first one because it performs a multiplication operation by m, which is a much smaller integer than the inverse of m.

Therefore, the resulting latency of a custom modulo circuit is much shorter than the latency of chaining CPU operations.

Figure 5:
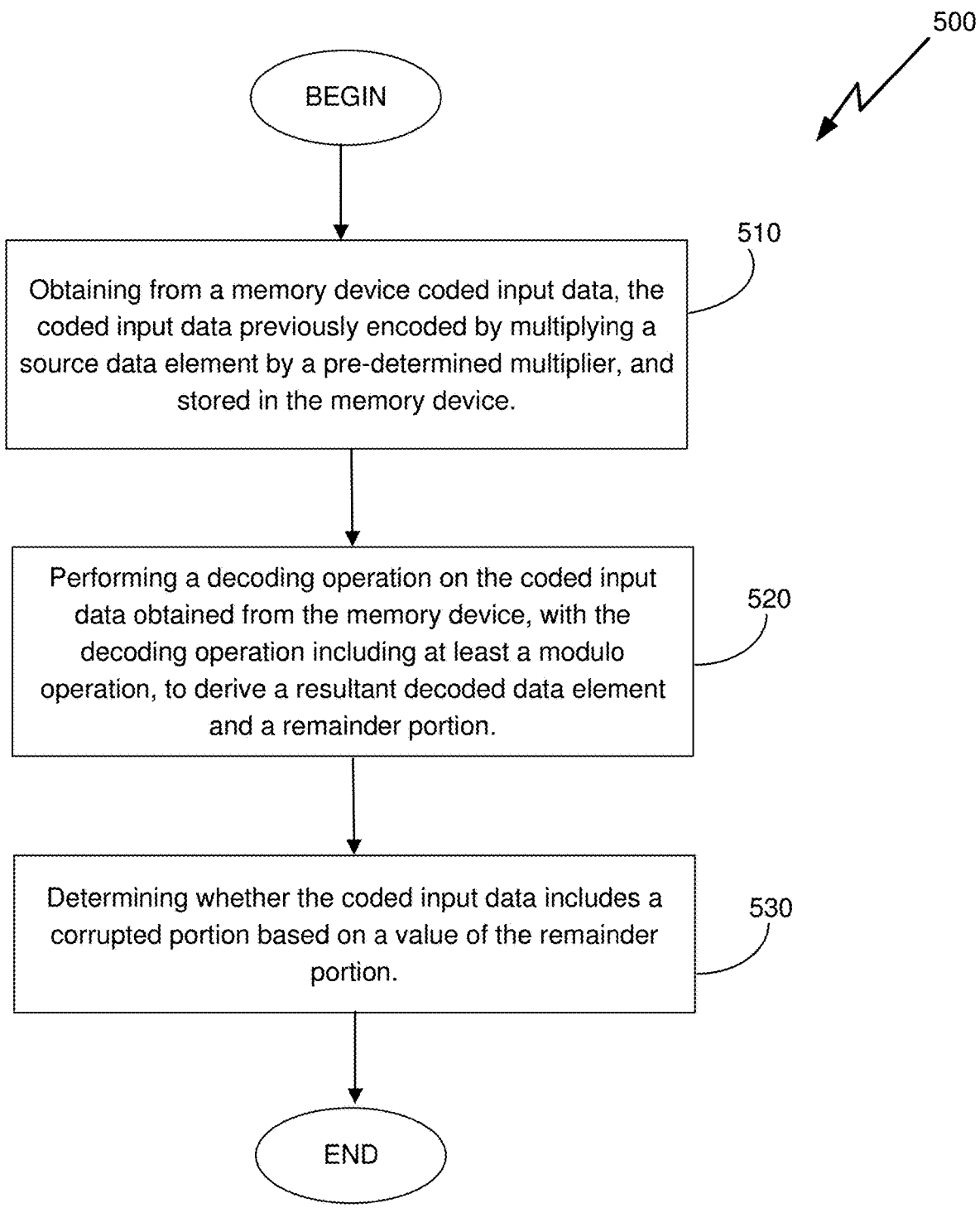
FIG. 5 is a flowchart of an example error identification and correction procedure.

With reference next to FIG. 5, a flowchart of an example error identification and correction procedure 500 is shown. The process 500 includes obtaining 510 from a memory device (which may a local or remote device) coded input data, with the coded input data previously being encoded (i.e., at an earlier time instance than that at which the obtaining operations 510 are being performed) by multiplying a source data element by a pre-determined multiplier, and stored in the memory device. The procedure 500 further includes performing 520 a decoding operation (e.g., by the decoder 110 of FIG. 1) on the coded input data obtained from the memory device, with the decoding operation including at least a modulo operation, to derive a resultant decoded data element and a remainder portion.

In various example embodiments, performing the modulo operation may include multiplying the coded input data by an inverse multiplier, determined (e.g., at an earlier time) from the pre-determined multiplier, to derive the resultant decoded data element. Multiplying the coded input data by the inverse multiplier may include applying a Booth encoder to generate partial products for a multiplication operation performed on the coded input data and the inverse multiplier, processing the generated partial products with a Wallace tree procedure to perform summation of the partial products to derive summed partial products, and adding the summed partial products to derive the resultant decoded data element. In some examples, the modulo operation may be performed by a regular divider unit.

With continued reference to FIG. 5, the procedure 500 additionally includes determining 530 whether the coded input data includes a corrupted portion based on a value of the remainder portion. In example embodiments, the procedure 500 further includes correcting the decoded data element, in response to a determination that the remainder portion has a nonzero value, to determine a corrected data element. Correcting the decoded data element may include correcting, based on the remainder portion, the decoded data that was modified at an earlier time instance as a result of a multi-bit error that occurred to an original coded data stored at the memory device (i.e., the error correcting approach of FIG. 5 is capable of correcting multi-bit errors that caused corruption/modification of the coded data value originally stored in a memory element in the memory device). In some example embodiments, correcting the decoded data may include searching an error correction table (e.g., one implemented by the error-lookup circuit 122 of FIG. 1) comprising a plurality of entries for different remainder values associated with the pre-determined multiplier, with each of the plurality of entries including a remainder field with a respective remainder value, an error field with a respective error value, and a sign field with a sign value indicating the sign of the error value. Such example embodiments further include combining, in response to matching the nonzero remainder to the remainder value for one of the plurality of entries, the sign value for the one of plurality of entries with a corresponding error value for the one of the plurality of entries to yield a signed error value, and adding the signed error value to the decoded data element to yield a corrected data value.

The pre-determined multiplier may be derived by identifying symbol representations for a code set comprising a plurality of code symbols, computing error values for each possible representation error for each of the plurality of code symbols, and determining the pre-determined multiplier for which a plurality of resultant remainder values, resulting from the modulo operation (e.g., a division operation or an equivalent computational process to more efficiently achieve the result of a division operation such as multiplication by an inverse) applied to the computed error values, is unique. Identifying symbol representations may include shuffling one or more portions of a first symbol representation with another one or more portions of a second symbol representation such that a range of error values resulting from the shuffling is smaller than an initial error range for an initial symbol representation for the code set (this process is referred to as the shuffling optimization technique discussed above). In some examples, the procedure may further include assigning to at least two of the computed error values a single remainder value, with each of the at least two of the computed error values resulting from an error associated with one or more particular bit locations of at least one of the symbol representations for the code set (this process is referred to as the aliasing optimization technique). In further examples, the process for determining an appropriate pre-determined multiplier may further include dividing at least one of the symbol representations into multiple smaller virtual groups of symbol representations, and applying one or more symbol optimization techniques to the each of the multiple smaller virtual groups of symbol representations to determine the pre-determined multiplier (this process is referred to as the aliasing optimization technique).

As described herein, in various examples the coding approaches described herein leave some bits unused (i.e., those bits are not needed for decoding an encoded data element). The excess bits in that encoded data elements can be put to a number of independent uses. Thus, the coded input data previously encoded and stored in the memory device may include one or more bits not required for decoding the coded input data, and the one or more bits may be utilized for non-coding functionality. The non-coding functionality may include one or more of, for example, memory tagging, Rowhammer detection, or other security and memory management functions.

Performing the various techniques and operations described herein may be facilitated by a controller device (e.g., a processor-based computing device). Such a controller device may include a processor-based device such as a computing device, and so forth, that typically includes a central processor unit or a processing core. In addition to the CPU, the system includes main memory, cache memory and bus interface circuits. The controller device may include a mass storage element, such as a hard drive (solid state hard drive, or other types of hard drive), or flash drive associated with the computer system. The controller device may further include a keyboard, or keypad, or some other user input interface, and a monitor, e.g., an LCD (liquid crystal display) monitor, that may be placed where a user can access them.

The controller device is configured to facilitate, for example, the implementation of the multi-use error correcting codes described herein. The storage device may thus include a computer program product that when executed on the controller device (which, as noted, may be a processor-based device) causes the processor-based device to perform operations to facilitate the implementation of procedures and operations described herein. The controller device may further include peripheral devices to enable input/output functionality. Such peripheral devices may include, for example, flash drive (e.g., a removable flash drive), or a network connection (e.g., implemented using a USB port and/or a wireless transceiver), for downloading related content to the connected system. Such peripheral devices may also be used for downloading software containing computer instructions to enable general operation of the respective system/device. Alternatively and/or additionally, in some embodiments, special purpose logic circuitry, e.g., an FPGA (field programmable gate array), an ASIC (application-specific integrated circuit), a DSP processor, a graphics processing unit (GPU), application processing unit (APU), etc., may be used in the implementations of the controller device. Other modules that may be included with the controller device may include a user interface to provide or receive input and output data. The controller device may include an operating system.

Computer programs (also known as programs, software, software applications or code) include machine instructions for a programmable processor, and may be implemented in a high-level procedural and/or object-oriented programming language, and/or in assembly/machine language. As used herein, the term "machine-readable medium" refers to any non-transitory computer program product, apparatus and/or device (e.g., magnetic discs, optical disks, memory, Programmable Logic Devices (PLDs)) used to provide machine instructions and/or data to a programmable processor, including a non-transitory machine-readable medium that receives machine instructions as a machine-readable signal.

In some embodiments, any suitable computer readable media can be used for storing instructions for performing the processes/operations/procedures described herein. For example, in some embodiments computer readable media can be transitory or non-transitory. For example, non-transitory computer readable media can include media such as magnetic media (such as hard disks, floppy disks, etc.), optical media (such as compact discs, digital video discs, Blu-ray discs, etc.), semiconductor media (such as flash memory, electrically programmable read only memory (EPROM), electrically erasable programmable read only Memory (EEPROM), etc.), any suitable media that is not fleeting or not devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

Next, a few use case for the MUSE framework described herein are considered. Consider a MUSE(80,69) code with 11-bit multiplier m=2005, thus giving us five bits of space that one can use for any task. With an 80-bit codeword, up to 69 bits of data can be stored, and still get ChipKill-like functionality, but since the basic granule of protection is 64 bits (8 bytes) in most existing schemes, there are five additional bits of free storage. This storage can be put to a number of uses, for example, for the ARM Memory Tagging Extensions (MTE) or Rowhammer detection (Rowhammer is a security exploit that takes advantage of an unintended interaction between DRAM memory cells). For example, salvaged bits can be used to counter the attack surface reduction of Rowhammer-based attacks which are known to bypass ECC. To do so, the salvaged five bits per word provided by MUSE(80,69), or 40 bits per cache line, are used for storing a hash code of the cache line worth of data. When an attacker rowhammers the bits in memory, the attacker also has to predictably corrupt the hash; otherwise, the attack will be detected. Thus, the attacker must profile the effectiveness of Rowhammer on a cache line and not a word granularity, as they must make sure that the corrupted cache line and hash match. If the attacker misses flipping one of the bits, the attack will fail with probability of $1-2^{-40}$ (i.e., the chance of collision for a 40-bit hash). In addition, the attacker should consider that ECC increases the time to rowhammer from minutes to days, and with hashing, the time to carry out the attack may increase to weeks, rendering this type of exploitation impractical.

Another potential use of leftover bits of MUSE coding schemes is for reliable Processing In-Memory (PIM). The idea behind (PIM) is to compute near the data—i.e., in main memory. Recently, PIM advanced from a theoretical research topic towards a practical hardware implementation of the multiply-accumulate (MAC) units within a commercial-grade HBM2 device. While the parity-based ECC seems to be a natural choice to protect the data of PIM modules, MUSE is more advantageous because it can protect both the stored data and the computation itself without the need to convert the redundancy information between the codes. For example, consider the following example setup: an HBM2 device with integrated MACs targeting neural-network applications. In this device, the data is read in 256b words and transferred to MACs for computation. To protect the data and the computing device, a MUSE(268, 256; m=3621) code can be used with only 12 bits of redundancy. HBM provisions 64b for ECC storage for each 64B of data, or 32b per 256b of data—2:6xmore than needed for MUSE (268,256; m=3621) code. Moreover, PIMs may use error information to diagnose the arithmetical units at runtime and guarantee reliable computation.

To test and evaluate the performance of some of the implementations described herein, several studies, simulations, and experiments were conducted. One issue that was investigated was to determine how the flexibility of the MUSE ECC framework compares to Reed-Solomon codes. The flexibility of the codes was compared through the prism of main code design parameters: (1) codeword length, (2) symbol size, and (3) data length for a given error model. For MUSE, these parameters define the set of valid code multipliers (basically determining redundancy and data storage bits of the code). If the number of available data bits is more than needed, the codeword may be shortened or those bits may enhance error detection guarantees of the code. For Reed-Solomon code, redundancy, code, and data lengths, are functions of symbol size. For example, for a single symbol error correcting Reed-Solomon code, the redundancy is always two symbols long. Hence, there is only one Reed-Solomon code for a given symbol size and codeword length. Moreover, the Reed-Solomon code by design does not differentiate between bit flip directions, and hence it is not possible to minimize its storage requirements by designing only for the asymmetrical errors. On the other hand, MUSE ECC allows the combination of multiple physical error models into one code as long as the multiplier satisfying the system's constraints is found. For example, and as discussed above, a MUSE code can be implemented that corrects refresh errors for any DRAM on a DIMM and any single bit error in the codeword.

Another performance aspect of MUSE that was investigated is that of bits trade-off. Reed-Solomon and MUSE codes were evaluated to compare their performance across four parameters of interest: (1) Number of saved bits, (2) Practicality for DRAM, (3) Single Symbol Error Correction, and (4) Multi-Symbol Error Detection rates. Both Reed-Solomon and MUSE ECC can be constructed in a way that offers bit savings. However, Reed-Solomon codes that offer saved bits are not practical in the context of DRAM memories because some DRAM chips would store more than one symbol. For example, assume a DIMM made with 4-bit DRAM devices protected by Reed-Solomon code with 5-bit symbols. This code saves six bits of storage, allowing to encode 134 bits of data into 144-bit codeword. In this scenario, the last bit of the first symbol and the first three bits of the second are written to the same device. If that device fails, they would not be able to correct the error, and such Reed-Solomon code cannot offer ChipKill guarantees. Thus, bits savings need to be evaluated in the context of practicality of the resulting code. With respect to error detection, as suggested earlier, MUSE ECC allows repurposing saved storage to gain higher multi-symbol error detection rates via increasing the multiplier value to fit the new redundancy budget. For example, consider the two codes MUSE(144, 128) and MUSE(144,132). The first code trades off four saved bits to use larger multiplier values (65519 vs. 4065) and gains higher multi-symbol error detection rates (99.17% vs. 86.71%). On the other hand, the Reed-Solomon code trades off both error correction and detection guarantees to gain storage, effectively rendering those codes impractical. However, while choosing zero saved bits, both RS(144,128) and MUSE(144,128) offer similar MSED rates of 99.36% and 99.17%, respectively. To compute multi-symbol detection rates (MSED), a Monte-Carlo-based simulator was implemented. In an n-symbol codeword the simulator randomly sampled 10,000 out of all $$\binom{k}{n}$$

possible k-symbol error patterns. For each symbol in those k chosen symbols, a random error was assigned, and a multi-symbol error was constructed. For each multi-symbol error a syndrome was computed and compared to all the syndromes of single symbol errors. If no match is found, then that specific multi-symbol error is detectable. Note that MUSE also detects multi-symbol errors if error correction causes symbols other than the corrected symbol to change. The fraction of detectable multi-symbol errors, out of all sampled multi-symbol errors, is the MSED rate. The simulator was implemented to ensure that at least 10 million samples were evaluated.

Figure 6A:
FIG. 6A is a table summarizes the design trade-offs for MUSE and REED-Solomon codes in terms of bit savings and Multi-Symbol Error Detection (MSED) rates.

FIG. 6A includes a table 600 summarizing the implementations trade-offs for MUSE and REED-Solomon codes in terms of bit savings and Multi-Symbol Error Detection (MSED) rates. As can be seem from the results in the table 600, both code families provide spare bits at the cost of reduced multi-symbol error detection rates. However, Reed-Solomon codes also lose ChipKill guarantees due to misalignment of symbols, which does not happen with MUSE ECC—each MUSE code guarantees ChipKill correction. Moreover, due to their construction constraints, Reed-Solomon codes offer bit saving only in multiples of two, while MUSE allows for more fine-grained trade-offs between required storage and MSED rates.

Figure 6B:
FIG. 6B is a table summarizing the latency and silicon area of various coding/decoding components.

The evaluation and testing of the MUSE framework also included an investigation of the VLSI overheads for the various MUSE implementations. The MUSE implementations included the basic arithmetic blocks, decoders, encoders and error correctors in Verilog, and were synthesized with Synopsys Design Compiler Version: R-2020.09-SP4 using NangateOpenCell 15 nm open-source standard cell library. Implementations were synthesized with full hierarchy ungrouping and high effort for delay, power, area optimizations. FIG. 6B includes a table 650 summarizing the latency and silicon area of those components for all discussed codes. As a point of reference, Intel Xeon Gold 5115 CPU, which was built with 14 nm technology, had a 2400 MHz bus between the CPU and the memory controller. Thus, this CPU will be used as a reference model to derive latency parameters of the decoders and encoders in the simulation models used to evaluate the overheads of introducing MUSE into the system. For example, the encoder latency of MUSE(144,132) code is 1.129 ns, while the error correction latency (including remainder computation and ELC) is 1.048 ns. Assuming a clock frequency of 2400 MHz or 417 psps, the encoder delays the writes to main memory by three clock cycles, while error correction delays the reads by three clock cycles. Since the code is systematic, in the common case of no errors, the reads have no delay.

The overheads for a Reed-Solomon code implementation were also considered. Reed-Solomon codes were picked since those codes are representative single device correct ECC schemes. For comparison, a series of encoders and error correction units were implemented for Reed-Solomon codes. Error correction was based on Peterson-Gorenstein-Zierler (PGZ) algorithm. Because SSC codes with at most 8-bit symbols are compared, to simplify the implementations, lookup tables were used to perform Galois Field arithmetic. Reed-Solomon encoders are simple XOR trees implementing binary multiplication of generator matrix and data, resulting in low area overheads and single clock cycle of latency. However, error correction is more complicated as it requires to perform Galois Field arithmetic. Hence, the main factor differentiating Reed-Solomon codes' latency and silicon area of error correction is the symbol size, and thus, number of entries in lookup tables for symbol arithmetic. The latency for error correction is 0.38 ns, area overheads are between 842 to 1053 $\mu m^2$, and power consumption ranges from 2 to 2.7 mW (see also table 650 in FIG. 6B for further details).

Because the parity based codes can be implemented with simple XOR trees of moderate depth, they result in smaller area and shorter latencies than comparable MUSE codes. For example, MUSE(80,67) code uses 12× more silicon area than RS(80,64), while only two more clock cycles of latency. These high area overheads are expected because Wallace Tree nodes are two serially connected full adders, while XOR trees use single XOR gate. For the error correction, Reed-Solomon has slightly smaller delay of single clock cycle vs. three cycles of MUSE. The lead of parity codes is due to being natively suited for binary arithmetic, and is thus not surprising.

Next, the performance impact of a MUSE decoder was evaluated with the gem5 simulator and SPEC 2017 (v1.1.5) benchmarking suite. A Haswell-like CPU with 3.4 GHz frequency, was configured with 64 kB L1 cache equally split for instructions and data, L2 256 kB/core, L3 of 8 MB, and 32 GB DDR4 memory. For the simulation, the TimingSimpleCPU model which provides detailed timing simulation of the memory subsystem, while executing instructions in a single clock cycle was picked. A gcc 4.8.5 to was used build dynamically linked fprate and intrate SPEC 2017 benchmarks with −O3 optimization level. The benchmarks were executed with reference inputs for 10 billion instructions, which is long enough to make sure that all caches are warmed up, the system is in steady mode, and the results are representative of benchmark behavior.

To emulate encoding latency, each store instruction was delayed by the latency of the encoder. There was no decoding penalty because all evaluated codes are systematic. To estimate performance penalty due to the delay of error correction, the loads were delayed by the latency of the error correcting circuit. To achieve this goal, the memory controller of the gem5 simulator was modified. For convenience, the extra latencies are summarized in the last two columns of the table 650 of FIG. 6B.

Figure 7:
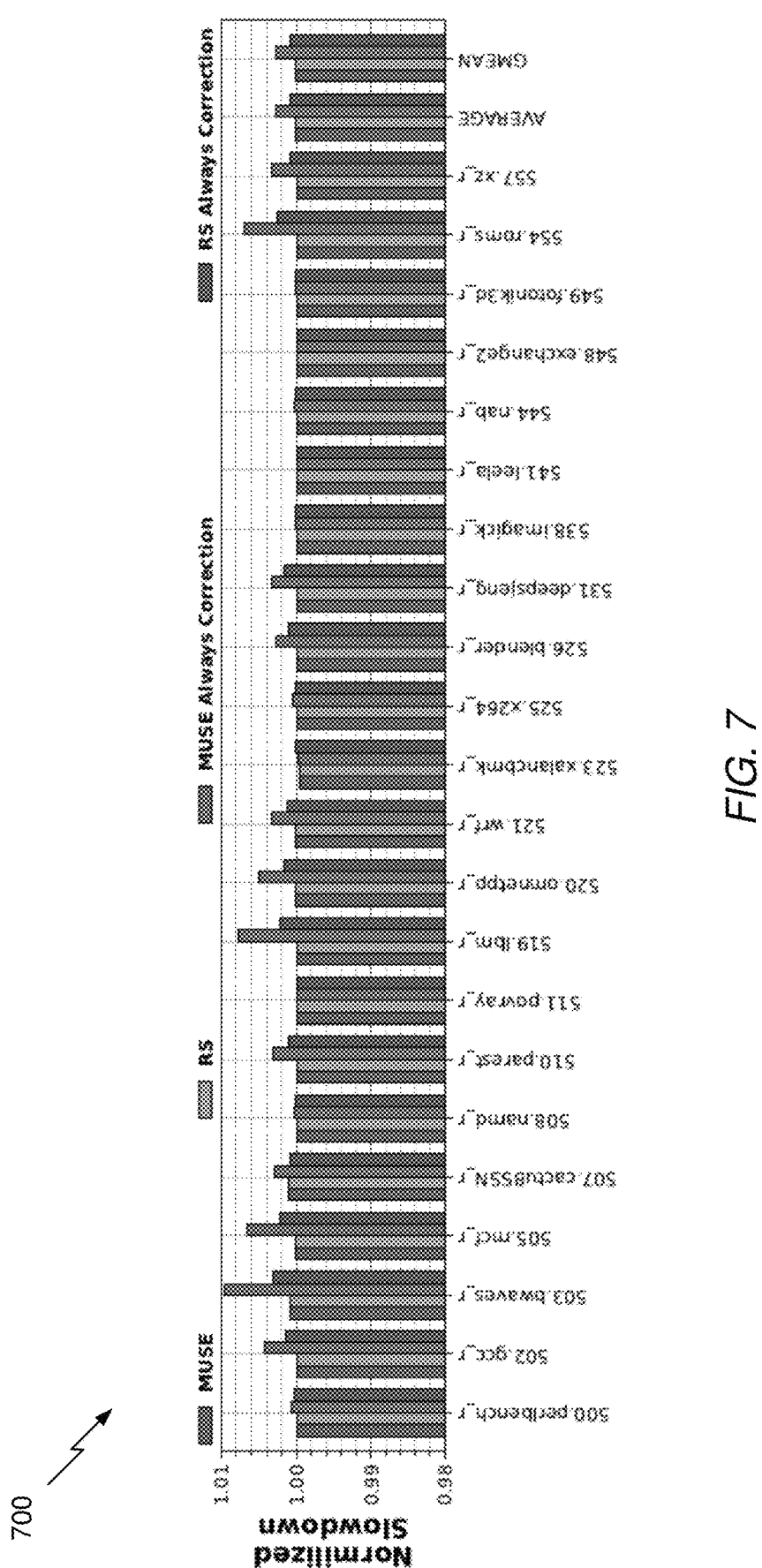
FIG. 7 is a graph summarizing the slowdown of SPEC 2017 due to two evaluated scenarios of error free operation, and error correction on every read operation.

FIG. 7 includes a graph 700 summarizing the slowdown of SPEC 2017 due to two evaluated scenarios: (1) error free operation, and (2) error correction on every read operation. As can be seem from FIG. 7, MUSE and Reed-Solomon have similar performance to the baseline, despite MUSE taking two more cycles for encoding than Reed-Solomon. This result is reasonable since write operations are rarely on a critical path of the system, and delaying them by one or three cycles is not very critical for performance. Assuming an unlikely event that every memory read results in corrupted data, Reed-Solomon would have a slightly better slowdown performance than MUSE (slowdown of 0.09% vs. 0.2% on average). The results of FIG. 7 demonstrate that the performance overheads of MUSE are minimal and comparable to those of Reed-Solomon code.

The evaluation of the proposed implementations also includes a case study of memory tagging. The case study involves an analysis of how use of the MUSE framework with ARM MTE (Memory Tagging Extension) security scheme improves power consumption of such a system without impact on performance. For the baseline, assume a system with ECC that implements memory tagging scheme, where each sixteen bytes of memory are tagged with a four-bit tag (similar to ARM-MTE), i.e., 16 bits of metadata for 512 bits of data.

There are two approaches to implementing this scheme in hardware. In a first approach, the metadata is stored in a disjoint manner in a special region of the main memory. Thus, when the metadata is needed, additional memory request would bring it to the CPU chip from the main memory. To mitigate the penalty of additional memory reads on performance, metadata caches may be used to cache the metadata for later use, effectively reducing the number of memory reads. The downsides of this approach are, (1) more complicated design due to integration of metadata caches, additional state machines to track the metadata state, etc., and (2) increased power consumption due to metadata memory traffic and metadata caches. The second approach is to store the metadata in the ECC portion of main memory, forgoing all ECC guarantees of a system. The benefits of this approach are clear: (1) inlined metadata, (2) no need for more complex hardware, and (3) no increased power consumption (only the relevant metadata is fetched from DRAM). The downside of the second approach is that the system has no ECC. MUSE allows the system designer to enjoy the benefits of these two approaches, namely, storing inlined metadata in the unused bits of the code to gain performance, lowering power consumption, having a simpler design, and keeping the system with ChipKill-level ECC.

The following aspects of the system were evaluated: (1) performance, (2) memory bus traffic, and (3) power consumption. To do so, the gem5 simulator was modified to issue an additional memory read for each cache miss to read a cache line worth of metadata from reserved memory space. In addition, for the system with metadata caching, a 32-entry 16 kB metadata cache was introduced for memory tags. The same gem5 configuration described above was also used for the memory tagging evaluation. The following three configurations were evaluated: (1) memory tagging with MUSE, (2) Reed-Solomon ECC with, and (3) without metadata caches. The SPEC-2017 benchmarks was run for 10B instructions on each of those configurations to measure execution latency, DRAM power consumption, and the number of read and write transactions on the memory bus.

Figure 8:
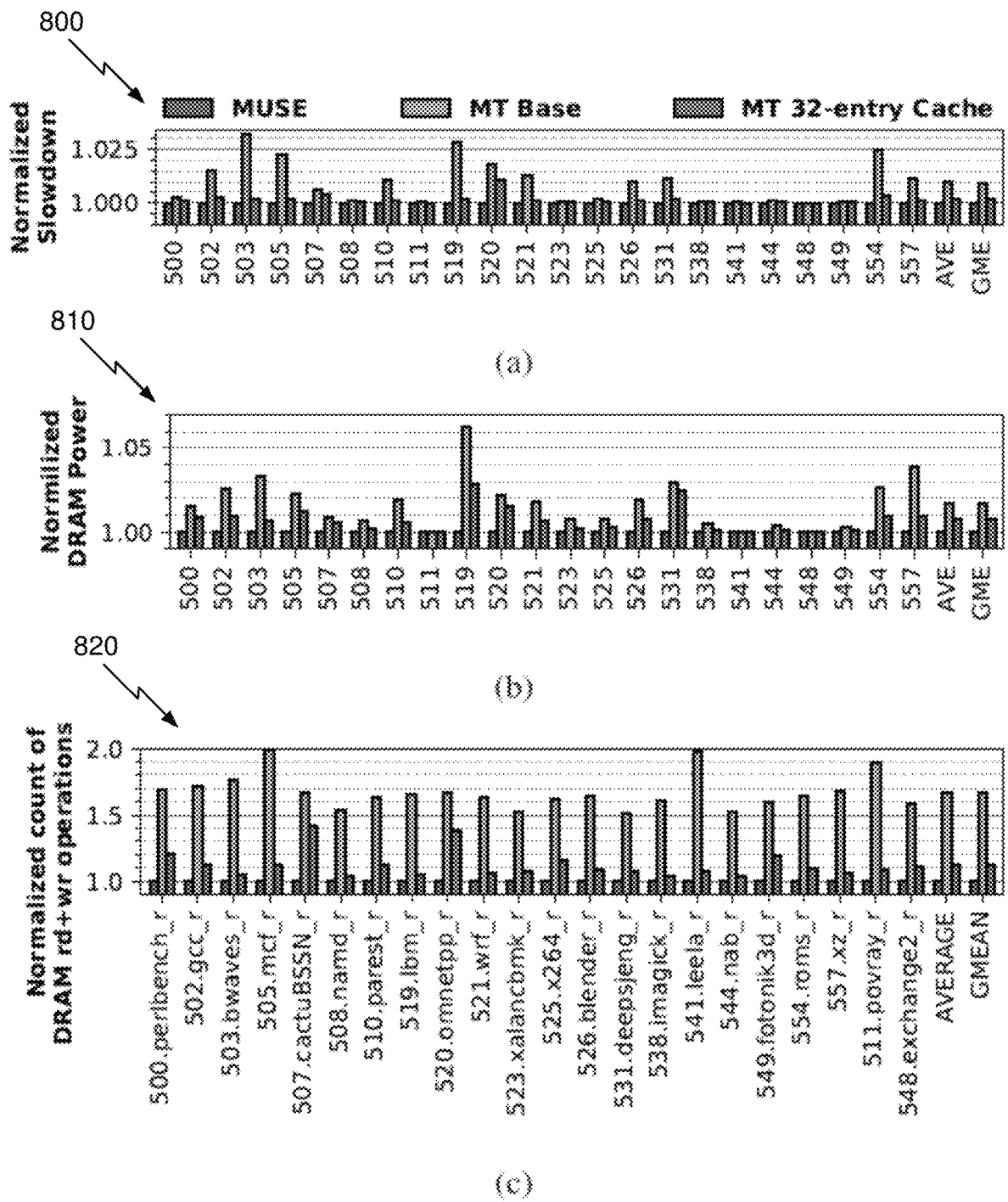
FIG. 8 are graphs showing performance results of a simulation for a system integrating memory tagging and MUSE.

FIG. 8 include graphs 800, 810, and 820 showing the results of the simulation. In FIG. 8 all the results were normalized to MUSE, with the graph 800 showing the normalized slowdown results, the graph 810 showing the normalized DRAM power consumption results, and the graph 820 showing the normalized number of read/write operations. As seen from the graphs, metadata caching equalizes the performance of memory tagging to that of a system with MUSE and inlined metadata, an improvement of about 1% compared to metadata-less memory tagging. As also seen from the figures, metadata caching equalizes the performance of memory tagging to that of a system with MUSE and inlined metadata (and improvement of about 1% compared to metadataless memory tagging). Moreover, the introduction of the metadata caching reduces DRAM power consumption by 2.36×: from 1.7% to 0.72% (peaking at 2.8% for 519 lbm). However, while metadata caches reduce the number of additional memory requests from 67% to 12% on average, memory tagging with cache still requires, on average, 12% more memory accesses than memory tagging with MUSE. These additional requests will result in the increased power consumption of the CPU's memory controllers.

Table 4, provided below, summarizes the total power consumption of the evaluated schemes. As can be seen from the summary, despite requiring more silicon area and power for MUSE, the overall system with memory tagging and MUSE saves at least 116.32 mW while offering Chipkill guarantees and simpler system design.

| | Components, [mW] | | | |
| --- | --- | --- | --- | --- |
| Scheme | DRAM | ECC | Total [mW] | diff, [mW] |
| MT w/ MUSE | 6468.90 | 2 × 13.671 | 6496.24 | 0 |
| MT w/ 16 kB cache | 6517.72 | 2 × 5.37 | 6528.46 | +32.22 |
| MT w/o cache | 6601.82 | 2 × 5.37 | 6612.56 | +116.32 |

Thus, described herein is the MUSE framework—an ECC construction that provides the ChipKill-level of error correction but also allows spare ECC space to be harvested and used for additional purposes. The MUSE framework uses formulations of residue codes and improves their performance through various optimizing features (e.g., shuffling of bits and atomization). The implementations of the MUSE framework can act as a "drop-in" replacement for commonly used ChipKill ECC schemes while using fewer bits for storage. Moreover, when MUSE ECC is evaluated in conjunction with security technique of Memory Tagging, the resultant system is more power efficient than systems with, for example, conventional Reed-Solomon codes. The benefits of MUSE codes also go beyond space savings and holding metadata. For instance, MUSE codes integrate much more easily into Processing In-Memory devices.

Although particular embodiments have been disclosed herein in detail, this has been done by way of example for purposes of illustration only, and is not intended to be limiting with respect to the scope of the appended claims, which follow. Features of the disclosed embodiments can be combined, rearranged, etc., within the scope of the invention to produce more embodiments. Some other aspects, advantages, and modifications are considered to be within the scope of the claims provided below. The claims presented are representative of at least some of the embodiments and features disclosed herein. Other unclaimed embodiments and features are also contemplated.

What is claimed is:

1. A method for error identification and correction comprising:
   obtaining from a memory device coded input data, the coded input data previously encoded by multiplying a source data element by a pre-determined multiplier, and stored in the memory device;
   performing a decoding operation on the coded input data obtained from the memory device, with the decoding operation including at least a modulo operation, to derive a resultant decoded data element and a remainder portion; and
   determining whether the coded input data includes a corrupted portion based on a value of the remainder portion;
   wherein the pre-determined multiplier is derived by:
      identifying symbol representations for a code set comprising a plurality of code symbols;
      computing error values for each possible representation error for each of the plurality of code symbols; and
      determining the pre-determined multiplier for which each of a plurality of resultant remainder values, resulting from the modulo operation applied to the computed error values, is unique.

2. The method of claim 1, further comprising:
   correcting the decoded data element, in response to a determination that the remainder portion has a nonzero value, to determine a corrected data element.

3. The method of claim 2, wherein correcting the decoded data element comprises one or more of:
   correcting, based on the remainder portion, the decoded data that was modified at an earlier time instance as a result of a multi-bit error that occurred to an original coded data stored at the memory device; and
   searching an error correction table comprising a plurality of entries for different remainder values associated with the pre-determined multiplier, wherein each of the plurality of entries includes a remainder field with a respective remainder value, an error field with a respective error value, and a sign field with a sign value indicating the sign of the error value, and in response to matching the nonzero remainder to the remainder value for one of the plurality of entries, combining the sign value for the one of plurality of entries with a corresponding error value for the one of the plurality of entries to yield a signed error value, and adding the signed error value to the decoded data element to yield a corrected data value.

4. The method of claim 1, wherein performing the modulo operation comprises:
   multiplying the coded input data by an inverse multiplier, determined from the pre-determined multiplier, to derive the resultant decoded data element.

5. The method of claim 4, wherein multiplying the coded input data by the inverse multiplier comprises:
   applying a Booth encoder to generate partial products for a multiplication operation performed on the coded input data and the inverse multiplier;
   processing the generated partial products with a Wallace tree procedure to perform summation of the partial products to derive summed partial products; and
   adding the summed partial products to derive the resultant decoded data element.

6. The method of claim 1, wherein identifying symbol representations comprises:
   shuffling one or more portions of a first symbol representation with another one or more portions of a second symbol representation such that a range of error values resulting from the shuffling is smaller than an initial error range for an initial symbol representation for the code set.

7. The method of claim 6, further comprising:
   assigning to at least two of the computed error values a single remainder value, wherein each of the at least two of the computed error values results from an error associated with one or more particular bit locations of at least one of the symbol representations for the code set.

8. The method of claim 1, further comprising:
   dividing at least one of the symbol representations into multiple smaller virtual groups of symbol representations; and
   applying one or more symbol optimization techniques to the each of the multiple smaller virtual groups of symbol representations to determine the pre-determined multiplier.

9. The method of claim 1, wherein the coded input data previously encoded and stored in the memory device includes one or more bits not required for decoding the coded input data, wherein the one or more bits are utilized for non-coding functionality, and wherein the non-coding functionality includes one or more of: memory tagging, or rowhammer detection.

10. A computing system comprising:
    a memory device; and
    a controller circuit in communication with the memory device, the controller circuit configured to:
       obtain, from the memory device, coded input data, the coded input data previously encoded by multiplying a source data element by a pre-determined multiplier, and stored in the memory device;
       perform a decoding operation on the coded input data obtained from the memory device, with the decoding operation including at least a modulo operation, to derive a resultant decoded data element and a remainder portion; and
       determine whether the coded input data includes a corrupted portion based on a value of the remainder portion;
    wherein the computing system is further configured to derive the pre-determined multiplier, including to:
       identify symbol representations for a code set comprising a plurality of code symbols;
       compute error values for each possible representation error for each of the plurality of code symbols; and
       determine the pre-determined multiplier for which each of a plurality of resultant remainder values, resulting from the modulo operation applied to the computed error values, is unique.

11. The system of claim 10, wherein the controller is further configured to:
    correct the decoded data element, in response to a determination that the remainder portion has a nonzero value, to determine a corrected data element.

12. The system of claim 10, wherein the controller configured to perform the modulo operation is configured to:
    multiply the coded input data by an inverse multiplier, determined from the pre-determined multiplier, to derive the resultant decoded data element.

13. Non-transitory computer readable media comprising computer instructions executable on a processor-based device to:

obtain from a memory device coded input data, the coded input data previously encoded by multiplying a source data element by a pre-determined multiplier, and stored in the memory device;

perform a decoding operation on the coded input data obtained from the memory device, with the decoding operation including at least a modulo operation, to derive a resultant decoded data element and a remainder portion; and determine whether the coded input data includes a corrupted portion based on a value of the remainder portion;

wherein the computer instruction comprise one or more instructions to cause the processor-based device to derive the pre-determined multiplier, including to:

identify symbol representations for a code set comprising a plurality of code symbols;

compute error values for each possible representation error for each of the plurality of code symbols; and determine the pre-determined multiplier for which each of a plurality of resultant remainder values, resulting from the modulo operation applied to the computed error values, is unique.

14. A method for error identification and correction comprising:

obtaining from a memory device coded input data, the coded input data previously encoded by multiplying a source data element by a pre-determined multiplier, and stored in the memory device;

performing a decoding operation on the coded input data obtained from the memory device, with the decoding operation including at least a modulo operation, to derive a resultant decoded data element and a remainder portion;

determining whether the coded input data includes a corrupted portion based on a value of the remainder portion; and correcting the decoded data element, in response to a determination that the remainder portion has a nonzero value, to determine a corrected data element;

wherein correcting the decoded data element comprises one or more of:

correcting, based on the remainder portion, the decoded data that was modified at an earlier time instance as a result of a multi-bit error that occurred to an original coded data stored at the memory device; and searching an error correction table comprising a plurality of entries for different remainder values associated with the pre-determined multiplier, wherein each of the plurality of entries includes a remainder field with a respective remainder value, an error field with a respective error value, and a sign field with a sign value indicating the sign of the error value, and in response to matching the nonzero remainder to the remainder value for one of the plurality of entries, combining the sign value for the one of plurality of entries with a corresponding error value for the one of the plurality of entries to yield a signed error value, and adding the signed error value to the decoded data element to yield a corrected data value.

15. The method of claim 14, wherein performing the modulo operation comprises:

multiplying the coded input data by an inverse multiplier, determined from the pre-determined multiplier, to derive the resultant decoded data element, including:

applying a Booth encoder to generate partial products for a multiplication operation performed on the coded input data and the inverse multiplier;

processing the generated partial products with a Wallace tree procedure to perform summation of the partial products to derive summed partial products; and adding the summed partial products to derive the resultant decoded data element.

16. The method of claim 14, wherein the coded input data previously encoded and stored in the memory device includes one or more bits not required for decoding the coded input data, and wherein the one or more bits are utilized for non-coding functionality.

17. The method of claim 16, wherein the non-coding functionality includes one or more of: memory tagging, or rowhammer detection.

18. A computing system comprising:

a memory device; and a controller circuit in communication with the memory device, the controller circuit configured to:

obtain, from the memory device, coded input data, the coded input data previously encoded by multiplying a source data element by a pre-determined multiplier, and stored in the memory device;

perform a decoding operation on the coded input data obtained from the memory device, with the decoding operation including at least a modulo operation, to derive a resultant decoded data element and a remainder portion;

determine whether the coded input data includes a corrupted portion based on a value of the remainder portion; and correct the decoded data element, in response to a determination that the remainder portion has a non-zero value, to determine a corrected data element;

wherein the controller configured to correct the decoded data element is configured to perform one or more of:

correct, based on the remainder portion, the decoded data that was modified at an earlier time instance as a result of a multi-bit error that occurred to an original coded data stored at the memory device; and search an error correction table comprising a plurality of entries for different remainder values associated with the pre-determined multiplier, wherein each of the plurality of entries includes a remainder field with a respective remainder value, an error field with a respective error value, and a sign field with a sign value indicating the sign of the error value, and combine, in response to matching the nonzero remainder to the remainder value for one of the plurality of entries, the sign value for the one of plurality of entries with a corresponding error value for the one of the plurality of entries to yield a signed error value, and adding the signed error value to the decoded data element to yield a corrected data value.

19. The system of claim 18, wherein the controller configured to perform the modulo operation is configured to:
multiply the coded input data by an inverse multiplier, determined from the pre-determined multiplier, to derive the resultant decoded data element, including to:
apply a Booth encoder to generate partial products for a multiplication operation performed on the coded input data and the inverse multiplier;
process the generated partial products with a Wallace tree procedure to perform summation of the partial products to derive summed partial products; and
add the summed partial products to derive the resultant decoded data element.

20. The system of claim 18, wherein the computing system is further configured to derive the pre-determined multiplier, including to:
identify symbol representations for a code set comprising a plurality of code symbols;
compute error values for each possible representation error for each of the plurality of code symbols; and
determine the pre-determined multiplier for which each of a plurality of resultant remainder values, resulting from the modulo operation applied to the computed error values, is unique.

21. The system of claim 18, wherein the coded input data previously encoded and stored in the memory device includes one or more bits not required for decoding the coded input data, wherein the one or more bits are utilized for non-coding functionality, and wherein the non-coding functionality includes one or more of: memory tagging, or rowhammer detection.

22. A method for error identification and correction comprising:
obtaining from a memory device coded input data, the coded input data previously encoded by multiplying a source data element by a pre-determined multiplier, and stored in the memory device;
performing a decoding operation on the coded input data obtained from the memory device, with the decoding operation including at least a modulo operation, to derive a resultant decoded data element and a remainder portion; and
determining whether the coded input data includes a corrupted portion based on a value of the remainder portion;
wherein the coded input data previously encoded and stored in the memory device includes one or more bits not required for decoding the coded input data, and wherein the one or more bits are utilized for non-coding functionality.

23. The method of claim 22, wherein the non-coding functionality includes one or more of: memory tagging, or rowhammer detection.

24. The method of claim 22, wherein performing the modulo operation comprises:
multiplying the coded input data by an inverse multiplier, determined from the pre-determined multiplier, to derive the resultant decoded data element.

25. The method of claim 24, wherein multiplying the coded input data by the inverse multiplier comprises:
applying a Booth encoder to generate partial products for a multiplication operation performed on the coded input data and the inverse multiplier;
processing the generated partial products with a Wallace tree procedure to perform summation of the partial products to derive summed partial products; and
adding the summed partial products to derive the resultant decoded data element.

26. A computing system comprising:
a memory device; and
a controller circuit in communication with the memory device, the controller circuit configured to:
obtain, from the memory device, coded input data, the coded input data previously encoded by multiplying a source data element by a pre-determined multiplier, and stored in the memory device;
perform a decoding operation on the coded input data obtained from the memory device, with the decoding operation including at least a modulo operation, to derive a resultant decoded data element and a remainder portion; and
determine whether the coded input data includes a corrupted portion based on a value of the remainder portion;
wherein the coded input data previously encoded and stored in the memory device includes one or more bits not required for decoding the coded input data.

27. The system of claim 26, wherein the one or more bits are utilized for non-coding functionality, wherein the non-coding functionality includes one or more of: memory tagging, or rowhammer detection.

28. The system of claim 26, wherein the controller configured to perform the modulo operation is configured to:
multiply the coded input data by an inverse multiplier, determined from the pre-determined multiplier, to derive the resultant decoded data element.

29. The system of claim 28, wherein the controller configured to multiply the coded input data by the inverse multiplier is configured to:
apply a Booth encoder to generate partial products for a multiplication operation performed on the coded input data and the inverse multiplier;
process the generated partial products with a Wallace tree procedure to perform summation of the partial products to derive summed partial products; and
add the summed partial products to derive the resultant decoded data element.

30. A computing system comprising:
a memory device; and
a controller circuit in communication with the memory device, the controller circuit configured to:
obtain, from the memory device, coded input data, the coded input data previously encoded by multiplying a source data element by a pre-determined multiplier, and stored in the memory device;
perform a decoding operation on the coded input data obtained from the memory device, with the decoding operation including at least a modulo operation, to derive a resultant decoded data element and a remainder portion; and
determine whether the coded input data includes a corrupted portion based on a value of the remainder portion;
wherein the controller configured to perform the modulo operation is configured to:
multiply the coded input data by an inverse multiplier, determined from the pre-determined multiplier, to derive the resultant decoded data element.

31. The system of claim 30, wherein the controller configured to multiply the coded input data by the inverse multiplier is configured to:
- apply a Booth encoder to generate partial products for a multiplication operation performed on the coded input data and the inverse multiplier;
- process the generated partial products with a Wallace tree procedure to perform summation of the partial products to derive summed partial products; and
- add the summed partial products to derive the resultant decoded data element.

* * * * *